US008344582B2

(12) United States Patent
Ionel et al.

(10) Patent No.: US 8,344,582 B2
(45) Date of Patent: Jan. 1, 2013

(54) ELECTRIC MACHINE WITH TEETH AND BRIDGES

(75) Inventors: Dan M. Ionel, Fox Point, WI (US); Alan E. Lesak, Franklin, WI (US)

(73) Assignee: Regal Beloit EPC Inc., Beloit, WI (US)

( * ) Notice: Subject to any disclaimer, the term of this patent is extended or adjusted under 35 U.S.C. 154(b) by 1197 days.

(21) Appl. No.: 11/957,766

(22) Filed: Dec. 17, 2007

(65) Prior Publication Data

US 2008/0093951 A1    Apr. 24, 2008

Related U.S. Application Data

(63) Continuation of application No. 11/734,901, filed on Apr. 13, 2007, now Pat. No. 7,687,965.

(60) Provisional application No. 60/791,755, filed on Apr. 13, 2006.

(51) Int. Cl.
*H02K 1/06* (2006.01)

(52) U.S. Cl. ... 310/216.103; 310/216.033; 310/216.036; 310/216.037; 310/40 MM

(58) Field of Classification Search .................... 310/51, 310/258, 216.033, 216.036, 216.037, 216.103, 310/40 MM, 269; *H02K 1/06*
See application file for complete search history.

(56) References Cited

U.S. PATENT DOCUMENTS

| | | | |
|---|---|---|---|
| 403,487 A | 5/1889 | Perret | |
| 452,420 A | 5/1891 | Wessel | |
| 578,280 A | 3/1897 | Turner | |
| 608,137 A | 7/1898 | Siemens | |
| 2,196,072 A | 4/1940 | Humphreys | |
| 2,601,517 A | 6/1952 | Hammes | |
| 3,390,289 A | 6/1968 | Dijken et al. | |
| 4,429,241 A * | 1/1984 | Ohara et al. | .................... 310/51 |
| 4,469,965 A | 9/1984 | Eckel | |
| 4,469,970 A | 9/1984 | Neumann | |
| 4,890,528 A | 1/1990 | Kamijima | |
| 5,000,066 A | 3/1991 | Gentiluomo | |
| 5,077,690 A | 12/1991 | Smith | |
| 5,659,218 A | 8/1997 | Kliman et al. | |
| 5,927,249 A | 7/1999 | Ackermann et al. | |
| 6,012,217 A | 1/2000 | Kliman et al. | |
| 6,534,892 B2 | 3/2003 | Braun et al. | |
| 6,710,501 B1 | 3/2004 | Kusumoto et al. | |
| 6,777,852 B2 | 8/2004 | Ishikawa et al. | |
| 6,975,049 B2 | 12/2005 | Ionel et al. | |
| 2002/0047475 A1 | 4/2002 | Kusumoto et al. | |
| 2005/0093381 A1* | 5/2005 | Ionel et al. | .................. 310/49 R |

* cited by examiner

*Primary Examiner* — John K Kim
(74) *Attorney, Agent, or Firm* — Michael Best & Friedrich LLP

(57) ABSTRACT

An electric machine includes a rotor, a first tooth portion, and a second tooth portion spaced apart from the first tooth portion and cooperating with the first tooth portion to at least partially define a rotor opening. At least a portion of the rotor is disposed within the rotor opening. A bridge has a first end connected to the first tooth portion and a second end connected to the second tooth portion such that the bridge defines a portion of the rotor opening. An aperture is defined by the bridge and is disposed between the first end and the second end.

2 Claims, 24 Drawing Sheets

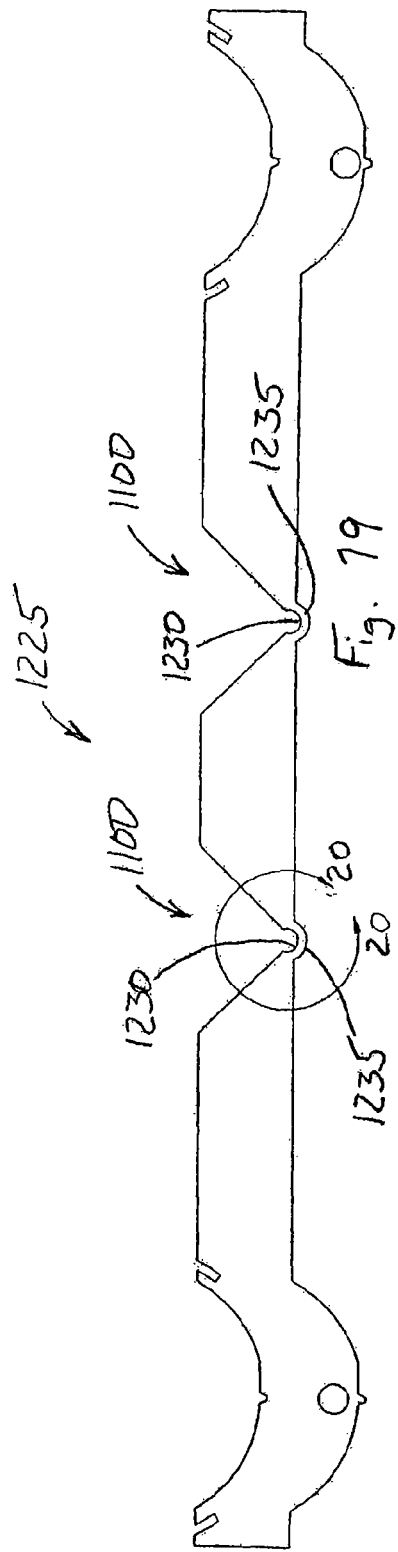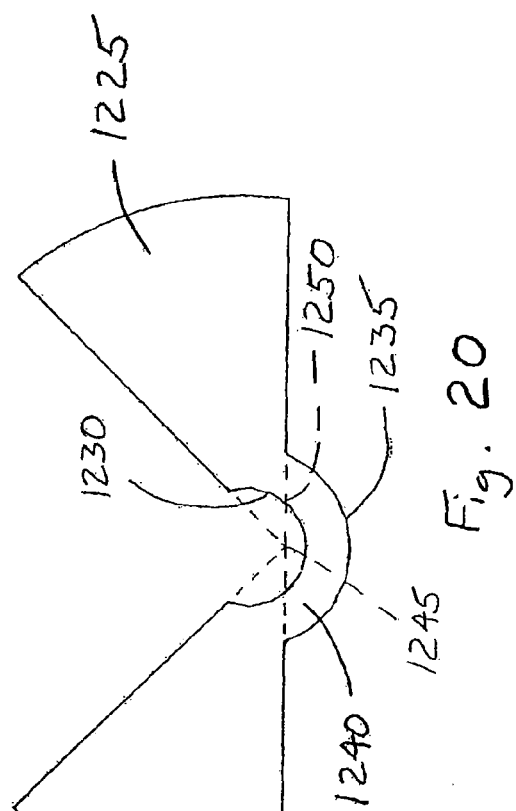

ELECTRIC MACHINE WITH TEETH AND BRIDGES

RELATED APPLICATION DATA

This application is a continuation of U.S. patent application Ser. No. 11/734,901, filed Apr. 13, 2007, which claims benefit under 35 U.S.C. Section 119(e) of U.S. Provisional Application No. 60/791,755, filed Apr. 13, 2006, both of which are fully incorporated herein by reference.

BACKGROUND

The invention relates to a stator assembly for an electric machine and a method of manufacturing the same. More particularly, the invention relates to an electric machine including a stator.

SUMMARY

In one embodiment, the invention provides a stator for a motor having a rotor. The stator includes a plurality of laminations each formed in a first elongated arrangement. Each lamination includes a first leg, a second leg, and an intermediate portion that are configured to be rearranged and stacked in a stackwise direction to define a core having a second U-shaped arrangement. A coil is coupled to the first leg.

In another construction, the invention provides a stator for a motor having a rotor. The stator includes a first leg including a first curved portion (sometimes referred to as a first tooth portion) and a first substantially straight portion and a coil coupled to the first leg. The stator also includes a second leg formed as a separate piece from the first leg. The second leg includes a second curved portion (sometimes referred to as a second tooth portion) and a second substantially straight portion. An intermediate portion is formed as a separate piece from the first leg and the second leg. The first leg, the second leg, and the intermediate portion are connected to one another to at least partially define a U-shaped magnetic circuit.

In yet another construction, the invention provides a stator for a motor. The stator includes a first leg formed from a first plurality of laminations. The first leg includes a first curved portion and a first substantially straight portion. A first coil is coupled to the first leg. A second leg is formed from a second plurality of laminations and is separate from the first leg. The second leg includes a second curved portion and a second substantially straight portion. A second coil is coupled to the second leg. An intermediate portion is formed from a third plurality of laminations and is separate from the first leg and the second leg. A first locking member is configured to connect the first leg and the intermediate portion and a second locking member is configured to connect the second leg and the intermediate portion. A bridge member is connected to the first curved portion and the second curved portion.

In another construction, the invention provides an electric machine that includes a rotor, a first tooth portion, and a second tooth portion spaced apart from the first tooth portion and cooperating with the first tooth portion to at least partially define a rotor opening. At least a portion of the rotor is disposed within the rotor opening. A bridge has a first end connected to the first tooth portion and a second end connected to the second tooth portion such that the bridge defines a portion of the rotor opening. An aperture is defined by the bridge and is disposed between the first end and the second end.

In yet another construction, the invention provides an electric machine that includes a rotor, a first tooth portion, a second tooth portion, a third tooth portion, and a fourth tooth portion cooperating with the first tooth portion, the second tooth portion, and the third tooth portion to at least partially define an air gap. At least a portion of the rotor is disposed adjacent the air gap. A first bridge has a first end connected to the first tooth portion and a second end connected to the second tooth portion such that the first bridge defines a portion of the air gap. A second bridge has a first end connected to the second tooth portion and a second end connected to the third tooth portion such that the second bridge defines a portion of the air gap. A third bridge has a first end connected to the third tooth portion and a second end connected to the fourth tooth portion such that the third bridge defines a portion of the air gap.

In still another construction, the invention provides an electric machine that includes a rotor, a first tooth portion, and a second tooth portion spaced apart from the first tooth portion and cooperating with the first tooth portion to at least partially define a rotor opening. At least a portion of the rotor is disposed within the rotor opening. A bridge has a first end connected to the first tooth portion and a second end connected to the second tooth portion such that the bridge defines a portion of the rotor opening. A corrugation is formed as part of the bridge and is disposed between the first end and the second end.

Other aspects and embodiments of the invention will become apparent by consideration of the detailed description and accompanying drawings.

BRIEF DESCRIPTION OF THE DRAWINGS

The detailed description particularly refers to the accompanying figures in which:

FIG. 14 is a front view of the lamination of FIG. 10 in a second arrangement;

FIG. 17 is a perspective view of a plurality of stator laminations of FIG. 16 in a second arrangement to define a stator core;

FIG. 18 is a front view of another lamination suitable for use in forming the stator of FIG. 2;

FIG. 19 is a front view of another lamination suitable for use in forming a stator of the type shown in FIG. 2;

FIG. 20 is an enlarged view of a portion of the lamination of FIG. 19 taken inside the circumference denoted by 20-20 of FIG. 19;

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way. Finally, it is to be understood that various features are referred to herein as openings, slots, and apertures which may be used interchangeably throughout the specification and the claims but are understood to refer to the same features as described in the specification.

Figure 1:
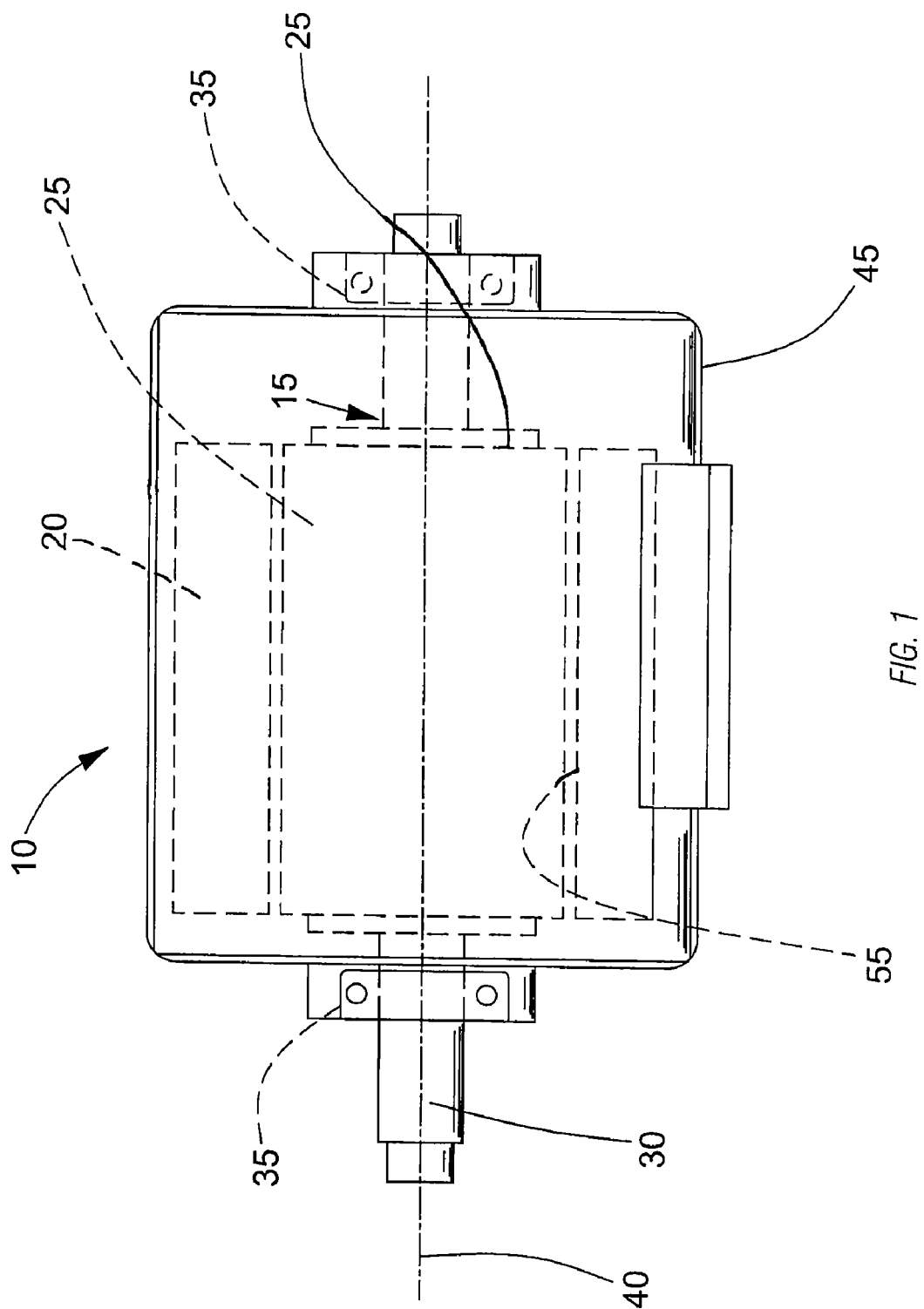
FIG. 1 is a schematic side view of a motor including a stator.

As illustrated in FIG. 1, a motor 10 generally includes a rotor 15 disposed within a stator 20. The rotor 15 includes a rotor core 25 and a shaft 30 that extends from one or both ends of the rotor core 25 to provide support points and to provide a convenient shaft power take off point. Generally, two or more bearings 35 engage the rotor shaft 30 and support the rotor 15 such that it rotates about a rotational axis 40. The motor 10 also includes a housing 45 that supports the stator 20. The stator 20 defines a substantially cylindrical aperture 55 that is centered on the rotational axis 40. When the rotor 15 is in its operating position relative to the stator 20, the rotor core 25 is generally centered within the aperture 55 such that a small air gap is established between the rotor core 25 and the stator 20. The air gap allows for relatively free rotation of the rotor 15 within the stator 20.

The motor 10 illustrated in FIG. 1 is a permanent magnet brushless motor. As such, the rotor 15 includes permanent magnets that define two or more magnetic poles. The stator 20 includes conductors (e.g., wire) forming one or more phase windings that can be selectively energized to produce a varying magnetic field. The permanent magnets of the rotor 15 interact with the varying magnetic field of the stator 20 to produce rotor rotation. As one of ordinary skill will realize, the present invention is suited for other types of electric motors (e.g., induction motors, variable reluctance motors) and other arrangements of motors (e.g., outer-rotor motors). As such, the invention should not be limited to the permanent magnet brushless motors illustrated herein. Furthermore, one of ordinary skill will realize that the present invention can also be applied to many types of generators. In addition, figures and description presented herein are directed to a stator and/or a motor. However, many of the features described and illustrated could be applied to wound rotors. Thus, while the figures and description refer to a brushless motor and/or a stator, other applications are possible.

FIGS. 2-22 illustrate various aspects of another stator 805 and electric machine 810 according to the invention. Before describing FIGS. 2-22 in detail, it should be noted that FIGS. 2-22 illustrate a motor 810 referred to in the following as a U-frame motor. However, some aspects illustrated in FIGS. 2-22 are applicable to other motor arrangements such as, for example C-frame motors as described in U.S. Pat. No. 6,982, 532, which is fully incorporated herein by reference. As such, the aspects discussed with regard to FIGS. 2-22 should not be limited to U-frame motors alone. Generally, the U-frame and C-frame motors described are permanent magnet brushless motors. However, other types of motors, such as, for example, shaded pole induction motors may employ features illustrated in FIGS. 2-22.

Figure 2:
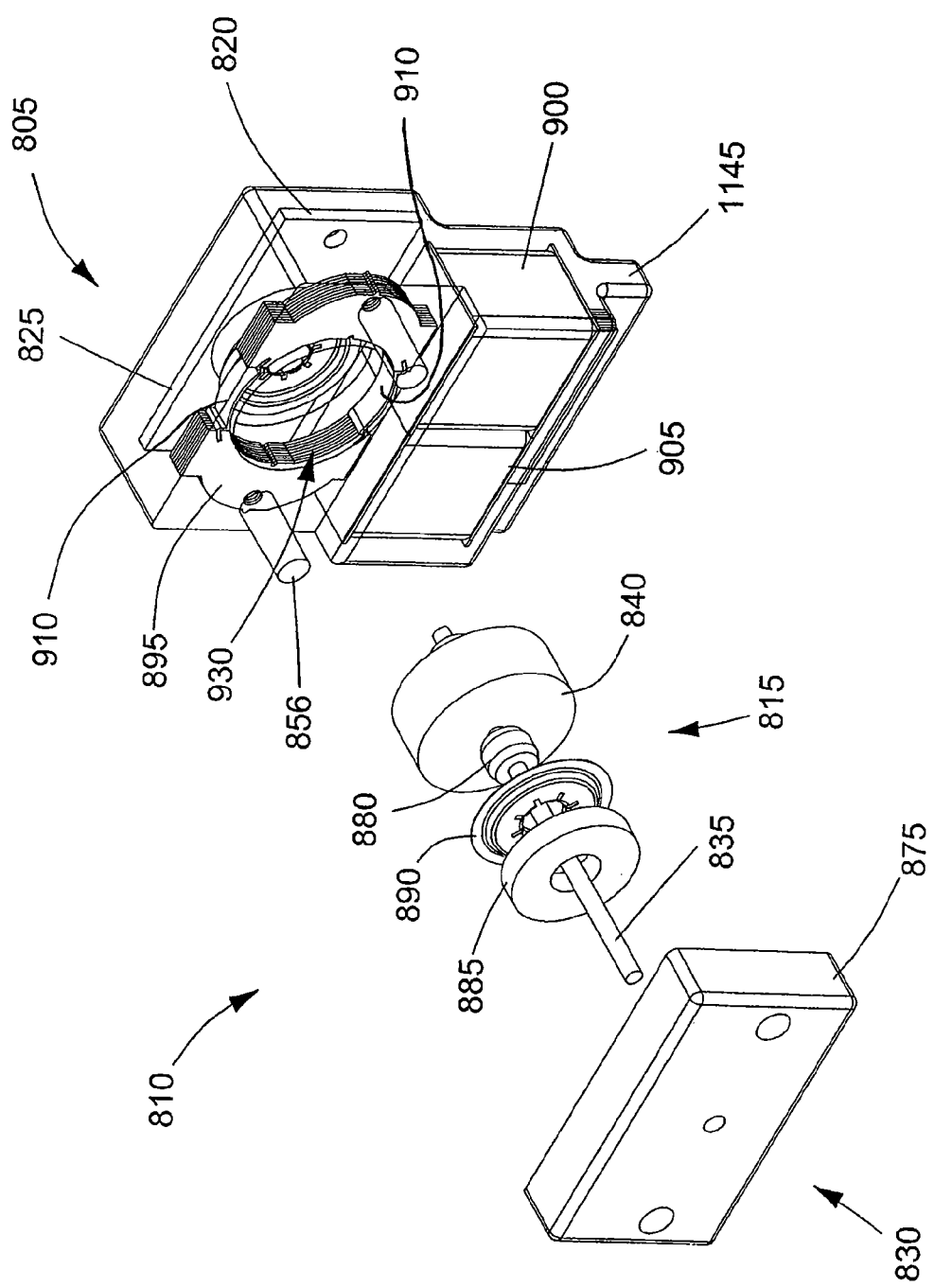
FIG. 2 is an exploded perspective view of another motor including another stator both according to another embodiment of the invention.

FIG. 2 illustrates a U-frame motor 810 that includes a rotor 815, the stator 805, a printed circuit board (PCB) 820, a first bearing arrangement 825, and a second bearing arrangement 830. The PCB 820 includes electrical components that allow for the control of the rotation of the rotor 815. Specifically, the electrical components and the PCB 820 are designed to receive an input electrical signal at a predetermined voltage and frequency (such as, for example, standard utility power or 12V dc) and convert the input signal to an output signal at a second voltage and frequency to produce the desired rotation of the rotor 815. In preferred constructions, the output signal is a high-frequency signal that produces rotation of the rotor 815 at a desired speed, as is well known in the motor art.

The rotor 815 includes a shaft 835 that supports a rotor core 840. The shaft 835 can be coupled to a component to allow for the transmission of power to the component to be driven by the motor 810. The rotor core 840 shown in FIG. 2 consists of a permanent magnet cylinder magnetized to define at least two magnetic poles and attached to the shaft 835. In other constructions the rotor core can include other components such as ferromagnetic laminations, electric conductors etc. as is known to those skilled in the art.

Figure 3:
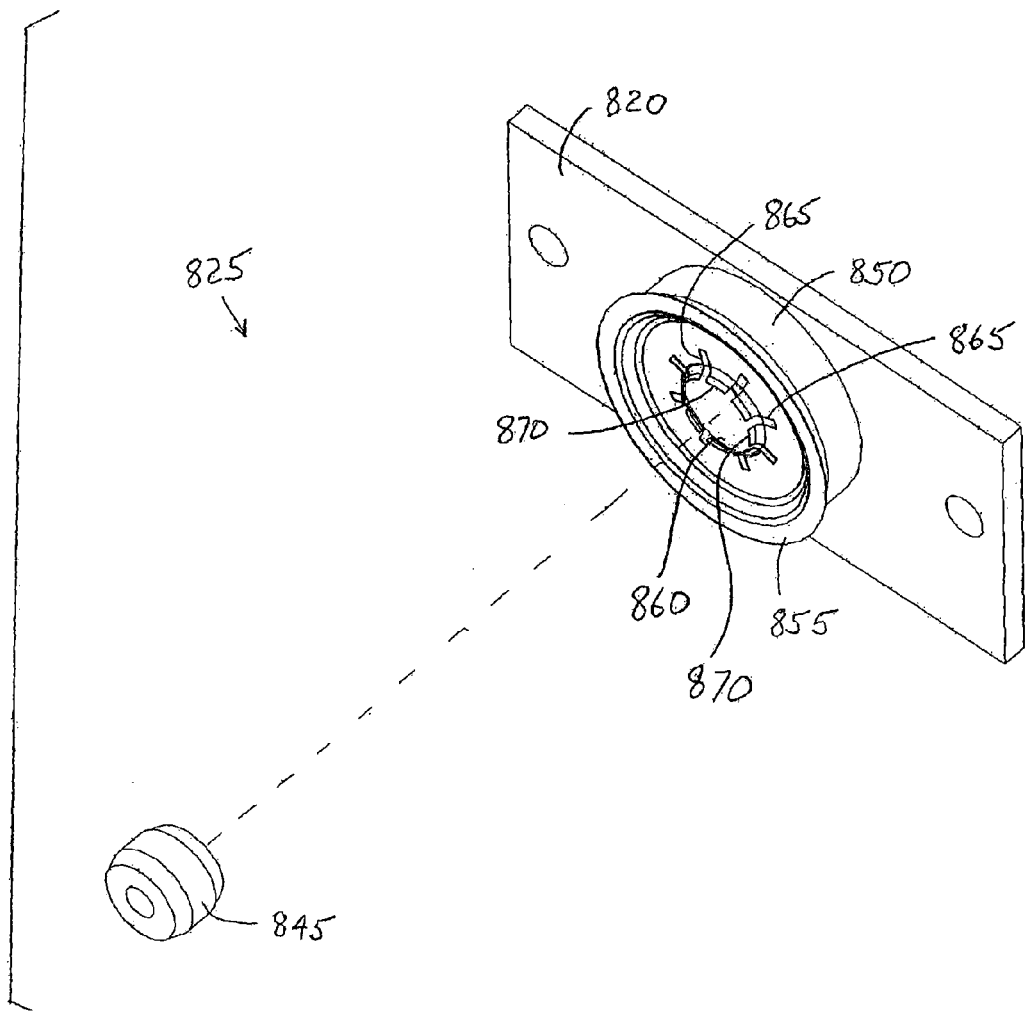
FIG. 3 is a partially exploded view of a first bearing assembly of the motor of FIG. 2.

The first bearing arrangement 825 shown in FIG. 3 includes a first bearing 845, a first lubrication member 850, and a first bearing retainer 855. This arrangement is described in detail in U.S. Patent Application Publication No. 2006/0038452 fully incorporated herein by reference. The first bearing arrangement 825 is supported by the PCB 820, as illustrated in FIG. 3. In the illustrated construction, the PCB 820 is encapsulated in a material (e.g., plastic) that also defines a bearing support portion (not shown). The encapsulating material defines a first encapsulation portion 1145. The first bearing 845 is supported by the bearing support portion such that the bearing 845 is able to move slightly to align with the rotor shaft 835. The shaft 835 extends into the bearing 845 and, in some constructions extends through a portion of the PCB 820. In the illustrated construction, a journal bearing, also commonly referred to as a self-aligning sleeve bearing, or bushing, is employed. However, other constructions may employ other types of bearings (e.g., roller, ball, needle, etc.) if desired.

The first lubrication member 850 fits within the bearing support portion and substantially surrounds the bearing 845. In preferred constructions, a lubricant soaked felt-like material is employed such that the felt-like material is able to deliver lubricant to the bearing 845 during the life of the motor 810.

The first bearing retainer 855 covers the first lubrication member 850 and a portion of the first bearing 845 and engages the bearing support portion to retain the first lubrication member 850 and the first bearing 845 in their operating position. The first bearing retainer 855 includes a central aperture 860 and a plurality of radially extending slots 865 that cooperate to define flexible fingers 870. The ends of the fingers 870 adjacent the central aperture 860 engage the bearing 845 and bias it toward its operating position.

With reference to FIG. 2, a second encapsulation portion 875 supports the second bearing arrangement 830. The second bearing arrangement 830 includes a second bearing 880, a second lubrication member 885, and a second bearing retainer 890 that are each similar to the corresponding first bearing 845, first lubrication member 850, and first bearing retainer 855 of the first bearing arrangement 825.

In one construction, the second encapsulation portion 875 is formed with a pocket that receives the second bearing 880, the second lubrication member 885, and the second bearing retainer 890. Thus, the second bearing retainer 890 engages the second encapsulation portion 875 and biases the second bearing 880 toward its operating position. In other constructions, the pocket is formed around the second bearing arrangement 830.

Figure 4:
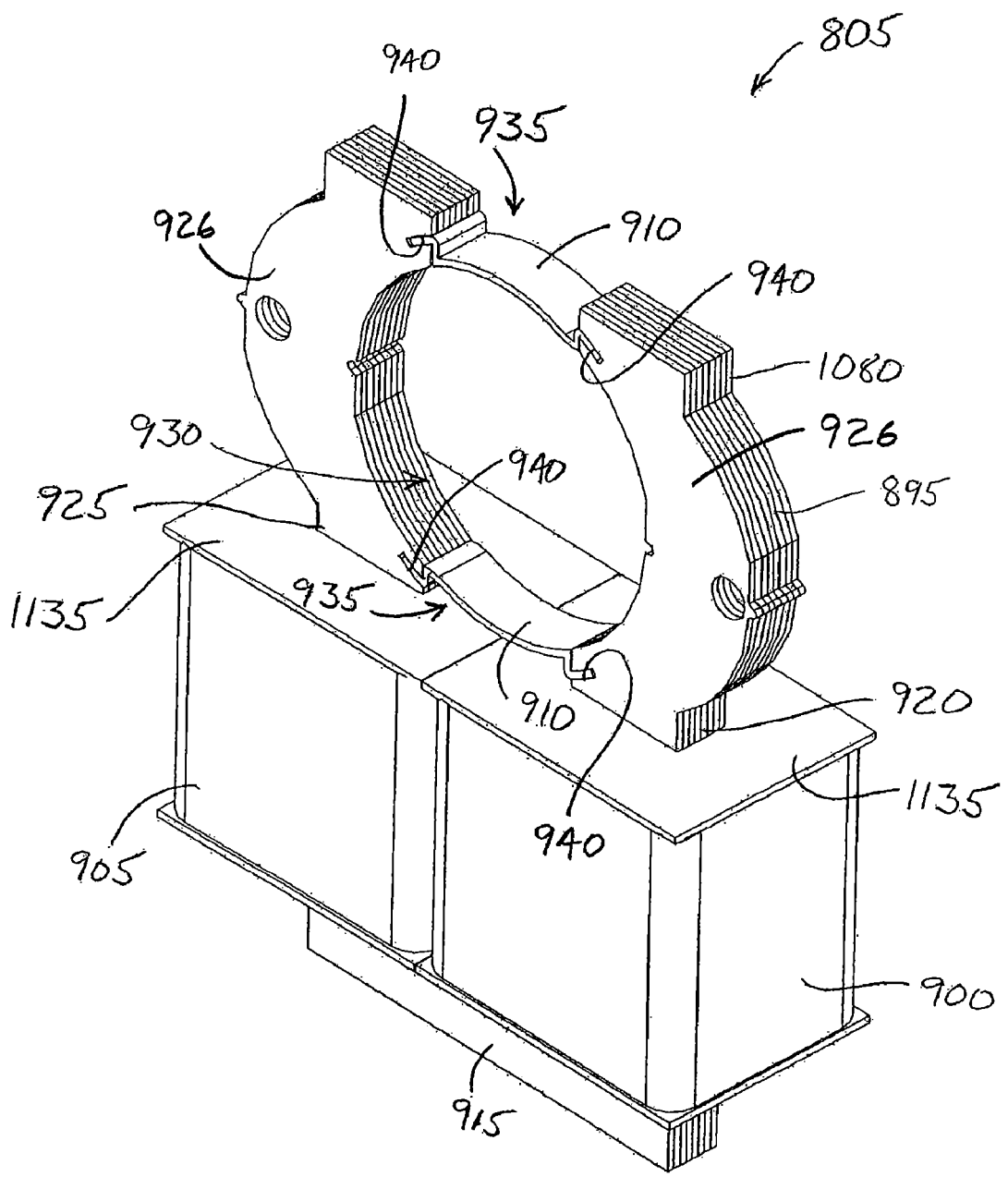
FIG. 4 is a perspective view of a stator of FIG. 2.

The stator 805, illustrated in FIG. 4, includes a stator core 895, first and second coils 900, 905, and two bridges 910. The stator core 895 includes a base 915, a first leg 920 that supports the first coil 900, and a second leg 925 that supports the second coil 905. The first leg 920 and the second leg 925 each include a substantially straight portion that receives the respective coil 900, 905, and curved portions 926 that extend beyond the coils and at least partially define a rotor space 930. The curved portions 926 are substantially C-shaped such that they define two openings 935 in the rotor space 930. The curved portions 926 are sized such that they surround a substantial portion of the circumference of the rotor (particularly the rotor core 840) when it is installed in the stator. In preferred constructions, the curved portions 926 are arranged to surround at least about 65 percent of the circumference of the rotor.

Two slots 940 are formed in each of the curved portions and are sized to receive the bridges 910. Each slot 940 is substantially circumferential and is disposed near the rotor space 930 adjacent the openings 935. Preferably, the slots 940 are shaped and sized such that they do not detrimentally influence the path of the magnetic flux in the stator core 895.

Figure 5:
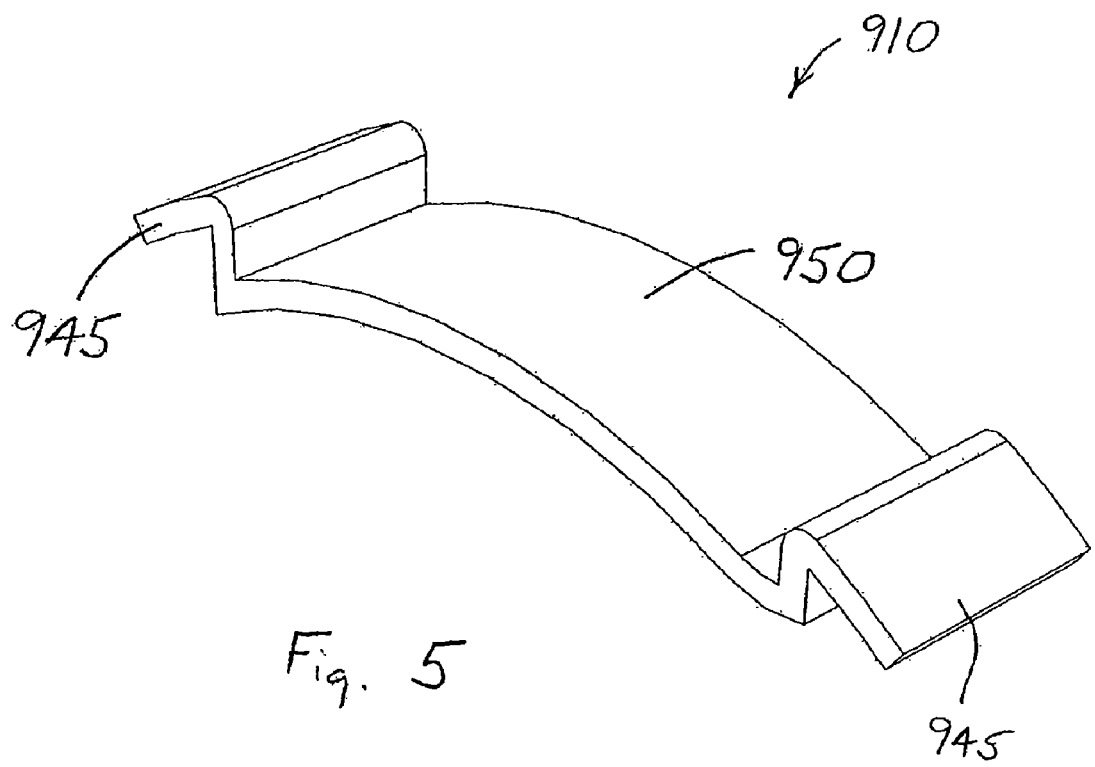
FIG. 5 is a perspective view of a bridge suitable for use with the stator of FIG. 2.

Bridges 910 and their use in U-frame motors are described in U.S. Pat. No. 6,975,049 and U.S. Patent Application Publication No. 2005/0223541, both of which are fully incorporated herein by reference. FIG. 5 illustrates one common bridge 910 that could be employed in the stator 805. The bridge 910 includes two engaging tabs 945 and an offset body portion 950. The engaging tabs 945 engage the slots 940 of the curved portion to attach the bridge 910 and position the offset body portion 950 adjacent the rotor space 930. The shape of the bridge 910 enhances the mechanical strength and reduces the vibration and noise that could be caused by electromagnetic forces. Also, the bridges 910 provide additional strength and rigidity to the stator 805, reduce the variation of the air-gap magnetic permeance around the circumference of the rotor 815 and therefore reduce cogging torque, noise, and vibration of the electrical machine 810. Also, the material used for the bridges 910 can be selected, and the shape and dimensions of the bridges 910 can be designed to improve other aspects of motor performance. For example, in one construction, discussed with regard to FIG. 9, the material characteristics and the design of the bridges 910 influence the parking position of the rotor 815, thereby improving the starting capability of the electrical machine 810.

Figure 6:
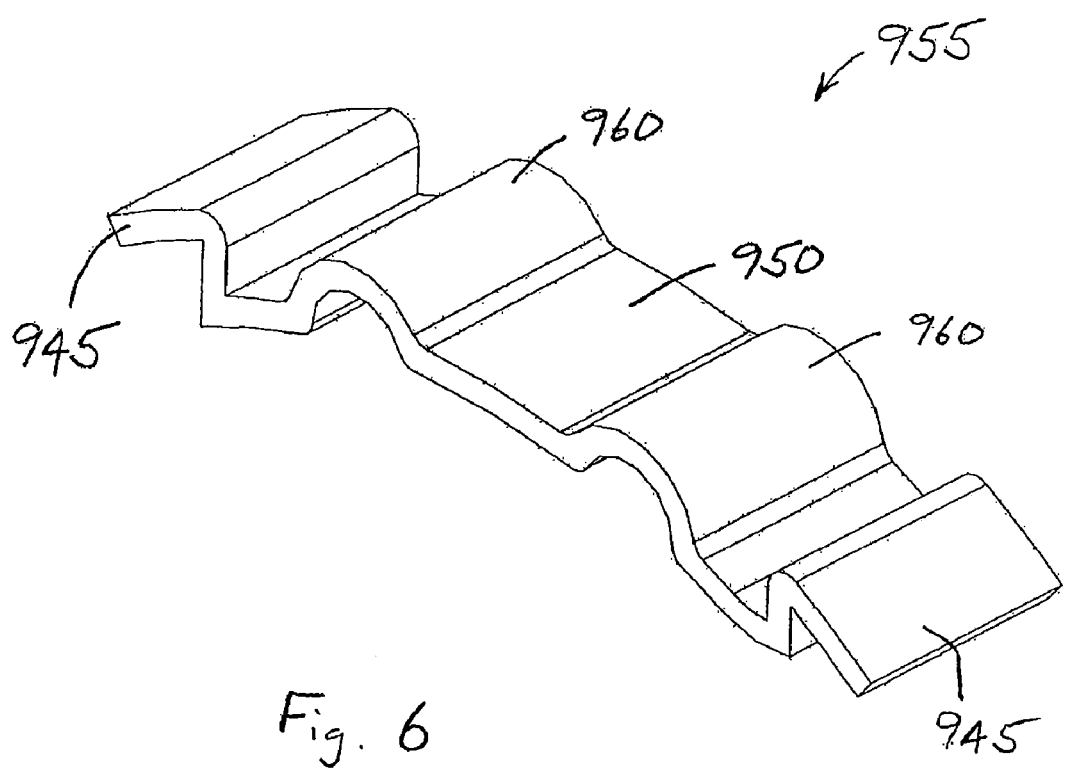
FIG. 6 is a perspective view of another bridge suitable for use with the stator of FIG. 2.

FIG. 6 illustrates another arrangement of a bridge 955. In this construction, the bridge 955 includes two engaging tabs 945 and a body portion 950. The engaging tabs 945 engage the stator core 895 in a manner similar to that described with regard to the bridge 910 of FIG. 5. The body portion 950 is similar to the body portion 950 of the bridge 910 of FIG. 5 and also includes two corrugations 960, or bumps that enhance the mechanical strength of the structure and modify the distribution of the air-gap magnetic permeance when compared to the construction incorporating bridge 910 of FIG. 5. It should be noted that other bridge constructions may employ only one corrugation 960 or may employ more than two corrugations 960 as desired.

Figure 7:
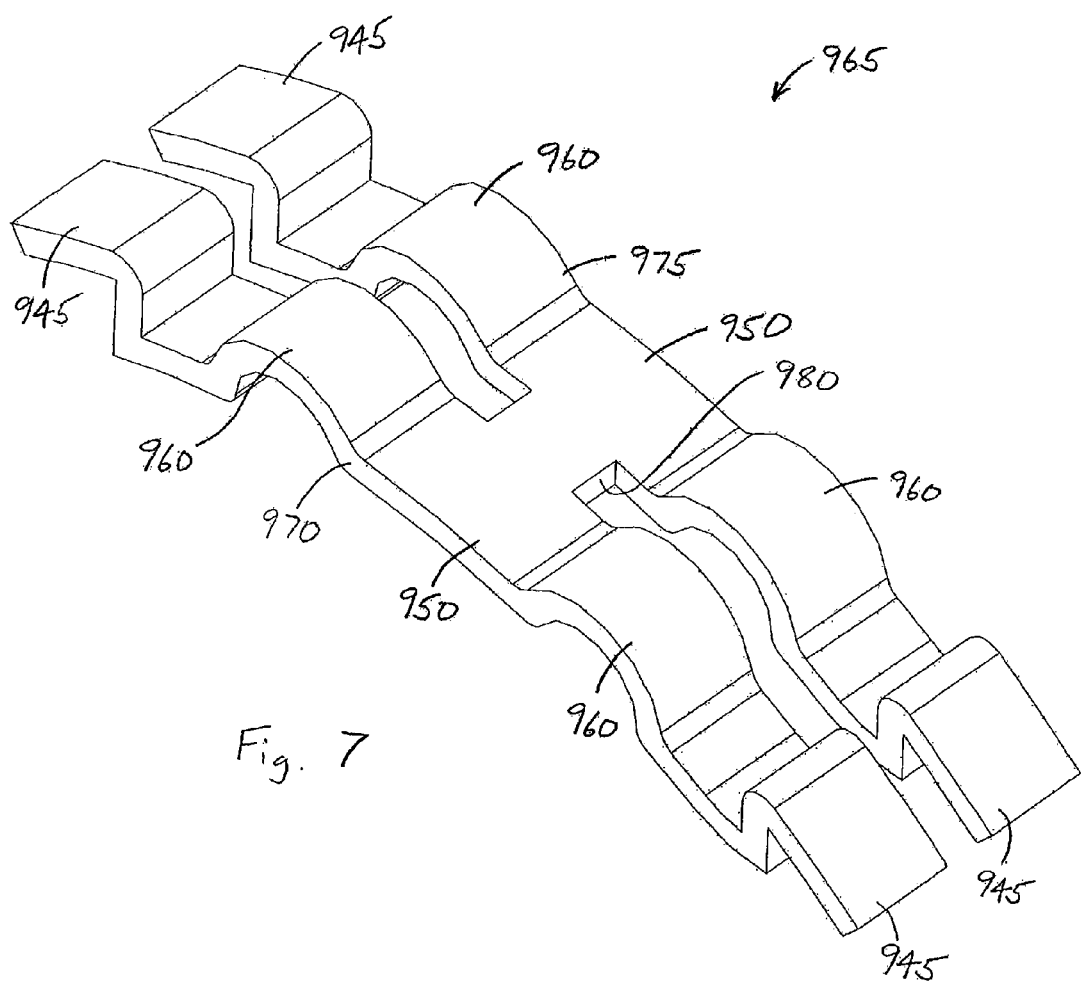
FIG. 7 is a perspective view of another bridge suitable for use with the stator of FIG. 2.
Figure 8:
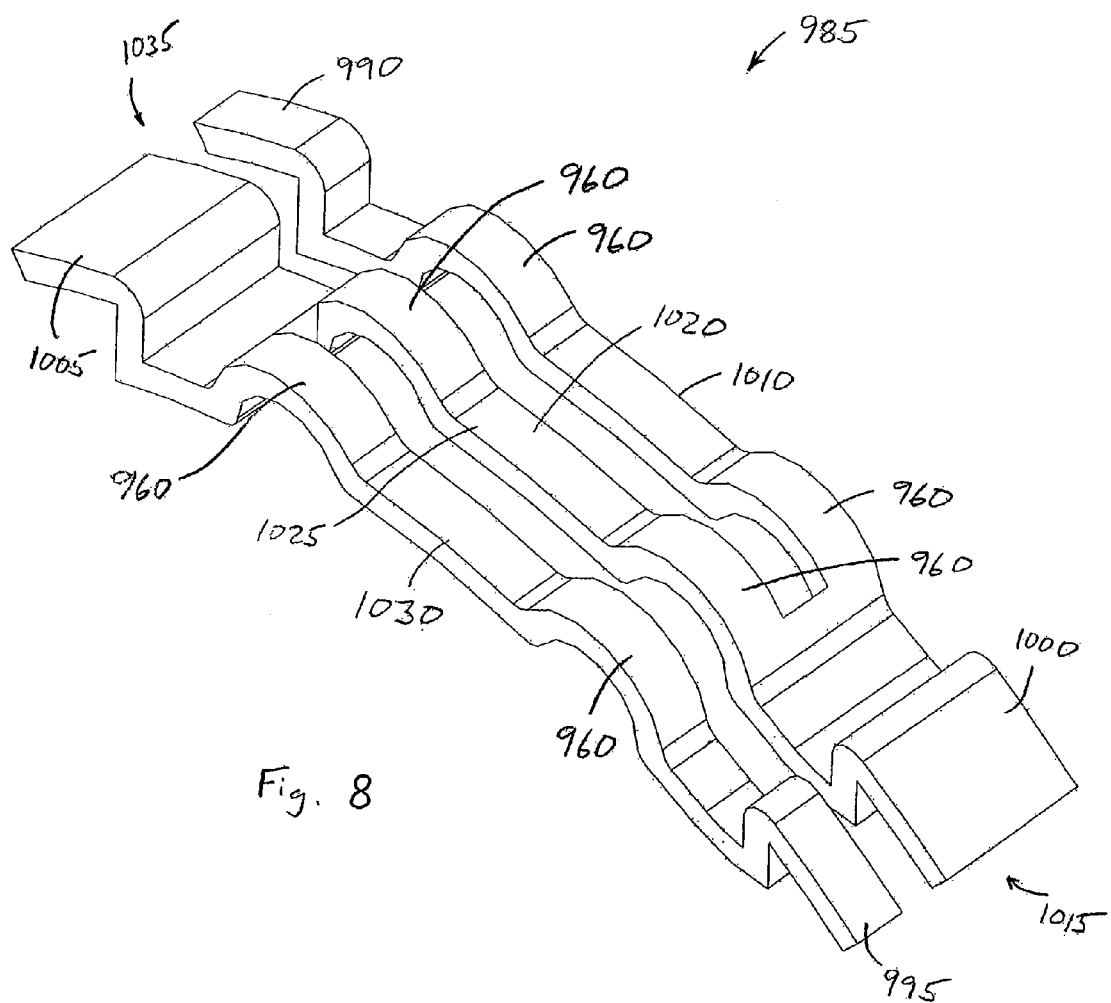
FIG. 8 is a perspective view of another bridge suitable for use with the stator of FIG. 2.
Figure 9:
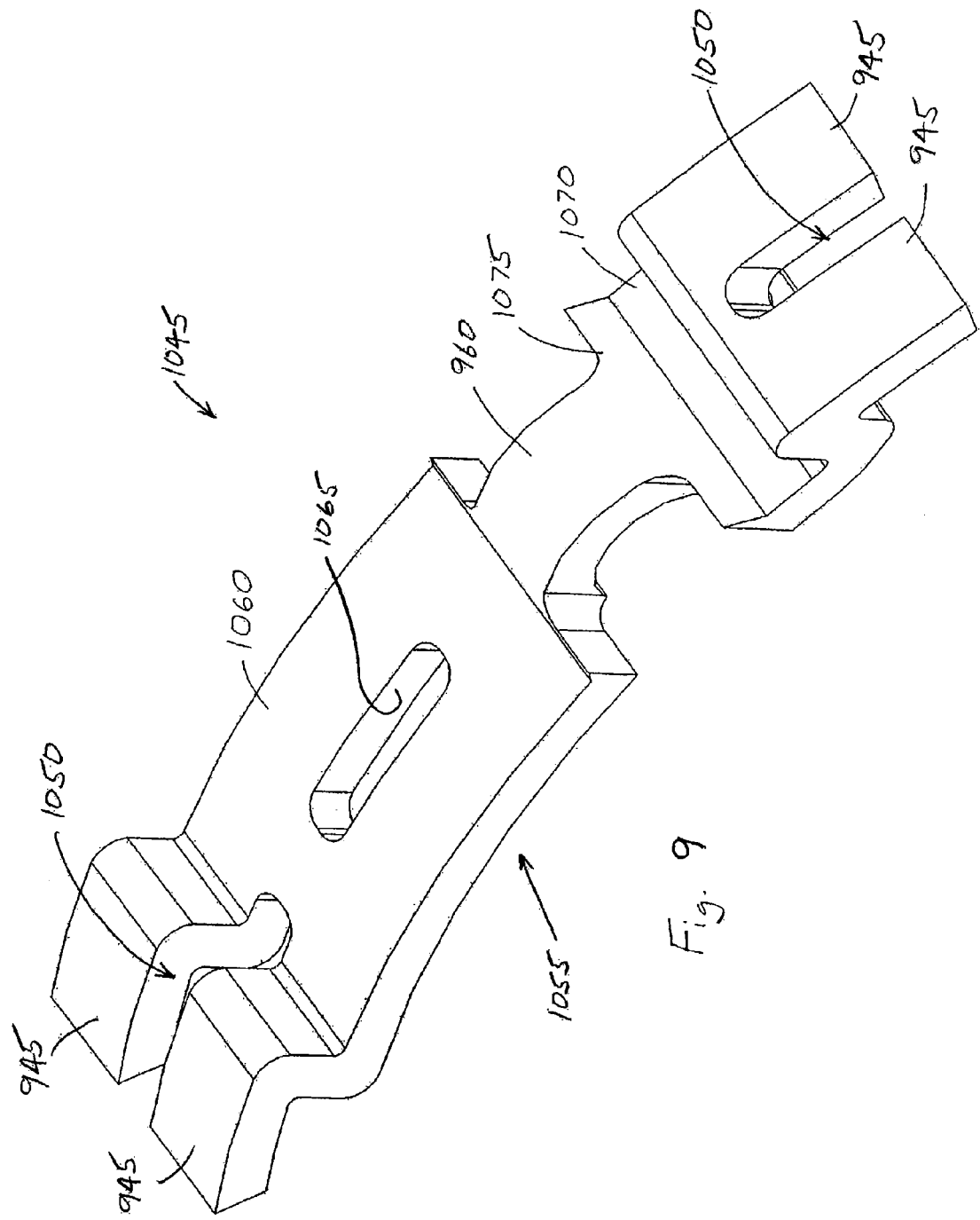
FIG. 9 is a perspective view of another bridge suitable for use with the stator of FIG. 2.

FIGS. 7-9 illustrate three additional constructions of bridges suitable for use with the stator 805 of FIG. 3. The bridge 965 of FIG. 7 includes a first portion 970 and a second portion 975 that are substantially similar to the bridge 955 of FIG. 6, but which are narrower. The first portion 970 and the second portion 975 are interconnected in their width direction by a ligament 980 disposed in the body portion 950 between corrugations 960. In the illustrated construction, a single ligament 980 is centered in the bridge 955. While a single slot 1050 is illustrated in FIG. 9, other constructions may offset the ligament 980 to one side or may include two or more ligaments 980.

The bridge 985 of FIG. 8 includes a first narrow end 990, a second narrow end 995, a first wide end 1000 and a second wide end 1005. A first narrow body portion 1010 extends from the first narrow end 990 to the first wide end 1000 to define a first end portion 1015. A second narrow body portion 1020 extends from the first wide end 1000 to the second wide end 1005 to define an inner portion 1025. A third narrow body portion 1030 extends from the second wide end 1005 to the second narrow end 995 to define a second end portion 1035. Thus, two slots 1040 are defined with one slot 1040 being between the first narrow body portion 1010 and the second narrow body portion 1020 and the second slot 1040 being between the second narrow body portion 1020 and the third narrow body portion 1030. The wide ends 1000, 1005 and narrow ends 990, 995 are similarly shaped such that they may engage the slots 940 in the curved portions of the core 895. In addition, the first end portion 1015, the second end portion 1035, and the inner portion 1025 include corrugations 960 to enhance the strength of the bridge 985. It should be noted that other constructions may employ only one slot 1040 or more than three slots 1040 if desired.

Another construction of a bridge 1045 shown in FIG. 9 includes first and second end portions that each define two engaging tabs 945 that are separated by a slot 1050. The engaging tabs 945 engage the stator core 895 in a manner similar to that described with regard to the bridge 910 of FIG. 5. The bridge 1045 also includes a body portion 1055 that is divided into three separate portions. A first portion 1060 extends from one end portion to a point slightly beyond the center of the bridge 1045. The first portion 1060 extends across the full width of the bridge 1045 and includes a slot 1065 approximately centered within the first portion 1060. A second portion 1070 extends from the second end portion and is substantially the full width of the bridge 1045. A third portion 1075 interconnects the first portion 1060 and the second portion 1070 and is substantially thinner than the full width of the bridge 1045. The third portion 1075 includes a corrugation 960 and is disposed substantially on one side of the bridge 1045 (see also FIG. 13). Other constructions may employ more slots 1065 if desired.

Magnetic bridges 910, 955, 965, 985, 1045 with a construction as illustrated in FIGS. 7-9 enhance the electromagnetic and mechanical performance, as well as the manufacturability of the motor 810. In preferred constructions, the bridges 910, 955, 965, 985, 1045 are manufactured using ferromagnetic material such as laminated electric steel. The bridges can be manufactured for example by stamping (punching) the laminations and then profile them by using a die. By corrugating the bridges the mechanical strength is increased and the vibration and noise, which could be caused by the electromagnetic forces acting on the bridge, is reduced. Furthermore, the corrugations 960 (bumps) are conveniently located to modify the distribution of the magnetic field in the motor air-gap and its surrounding regions. For example, the construction of FIG. 9 includes one corrugation 960 that increases the air-gap between the rotor 815 and the bridge 1045 and covers only part of the core axial length, thereby defining an effective magnetic opening of the air-gap, which reduces the magnetic leakage flux. The asymmetric position of the corrugation 960 and of the air-gap opening enhances the rotor parking capability and the shape of the motor back emf for electronic control.

The magnetic bridges 965, 985, 1045 of FIGS. 7-9 define slots that substantially divide the bridge 965, 985, 1045 into two or more axial sections that reduce the path of the induced eddy currents and minimize core losses. The slots are formed to maintain the one-piece integrity of the bridge 965, 985, 1045 and enhance manufacturability. The proportion between the width of the slots and the bridge 965, 985, 1045 is also conveniently designed to control the magnetic saturation in the bridge 965, 985, 1045 and enhance motor performance. Other combinations of slots and corrugations, different from those shown in the figures, are also possible.

Figure 27:
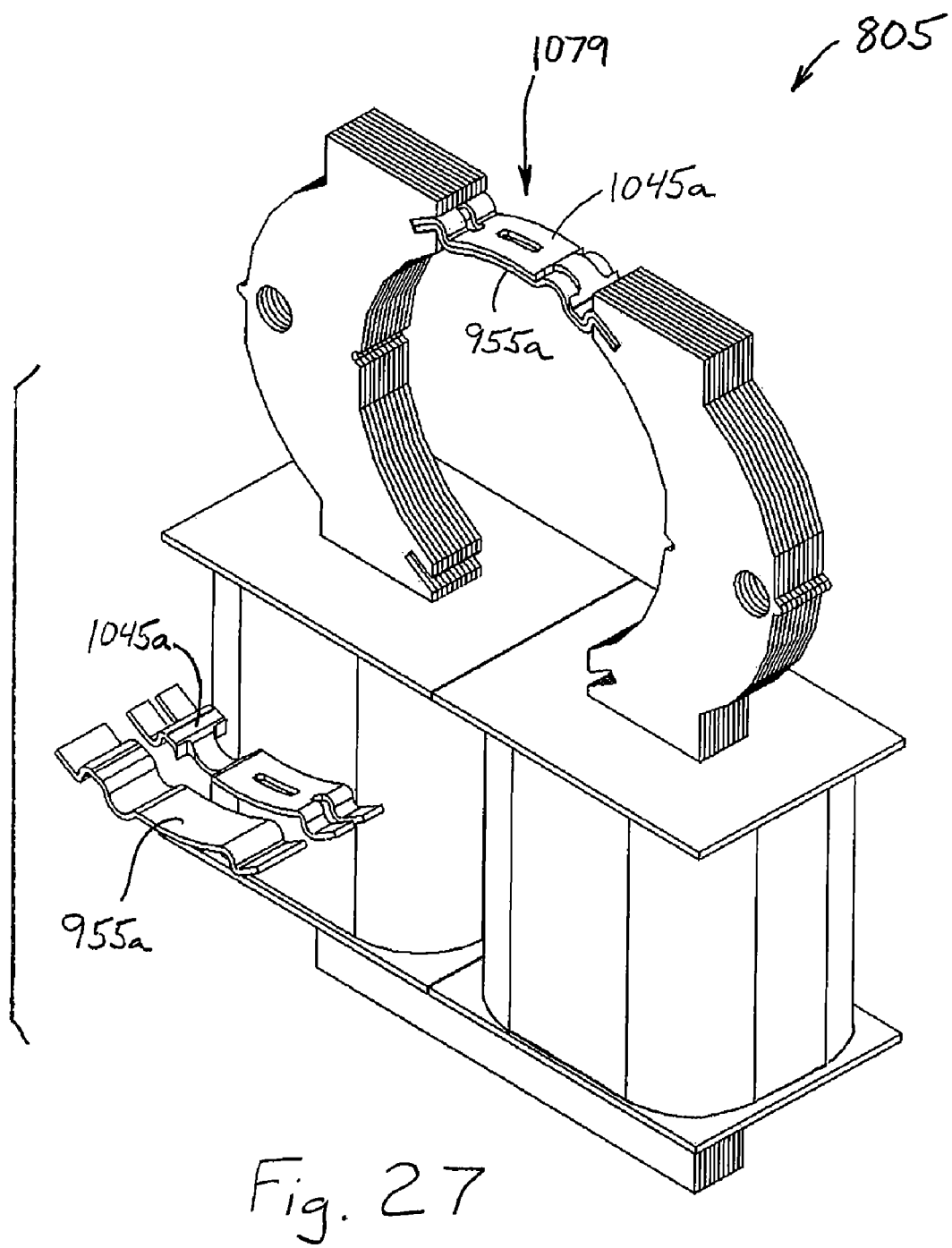
FIG. 27 is a partially-exploded perspective view of the stator of FIG. 13 including a stacked bridge arrangement.

While one-piece bridge constructions have been described, it should be noted that several bridge constructions may include two or more components that cooperate to define the bridge. For example, one construction illustrated in FIG. 27 includes a first bridge portion 955*a* that is disposed near the rotor and a second bridge portion 1045*a* that is disposed on top of the first bridge portion 955*a* to in effect define a thicker bridge 1079. In the illustrated construction, two different bridge portions are employed. These two bridge portions can be made using similar or different materials if desired. Alternatively, other constructions may employ similarly shaped bridge portions and can be made from similar or different materials. Thus, FIG. 27 illustrates a construction in which two bridge portions 955*a*, 1045*a* are stacked on top of one another to define a stacked bridge 1079. In one construction, a substantially solid copper first bridge portion is placed near the rotor and a steel portion shaped like one of the bridges 910, 955, 965, 985, 1045, or another suitable shape, is placed on top of the first portion to complete the bridge. Such an arrangement may provide electromagnetic or operational advantages that are desirable. For example, the aforementioned example would function like a shading coil and would improve the starting performance of a single-phase induction motor incorporating the stator.

Figure 10:
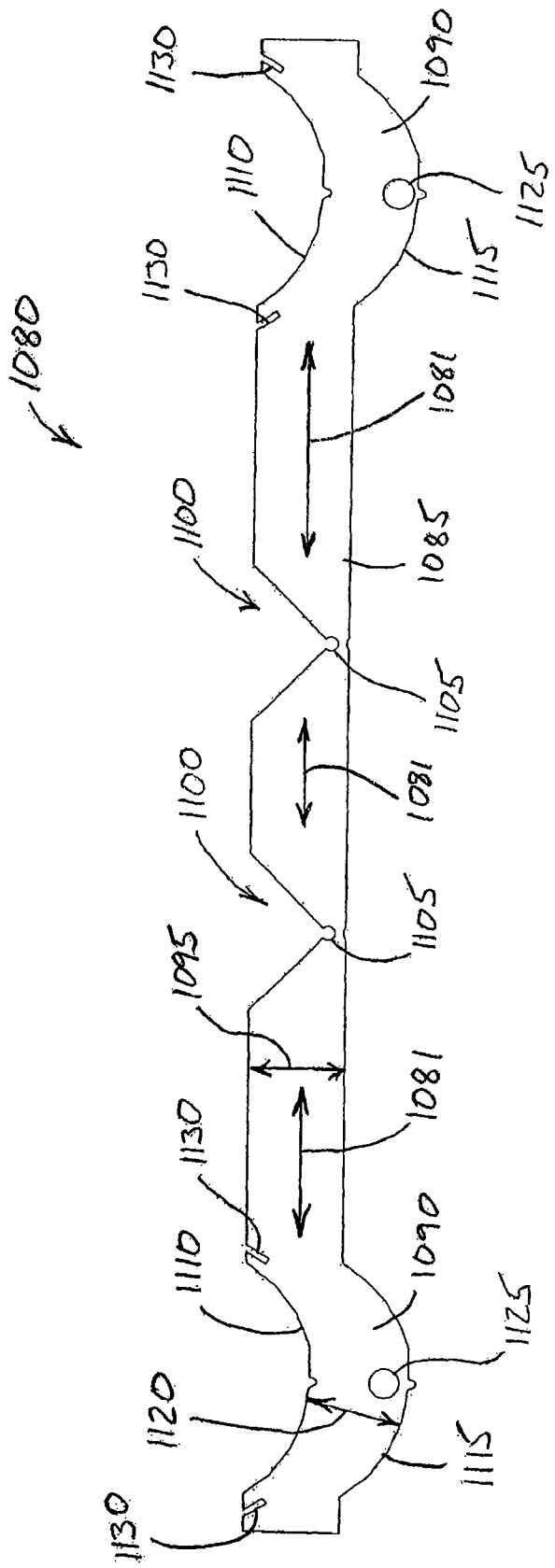
FIG. 10 is a front view of a lamination suitable for use in assembling the stator of FIG. 2.
Figure 11:
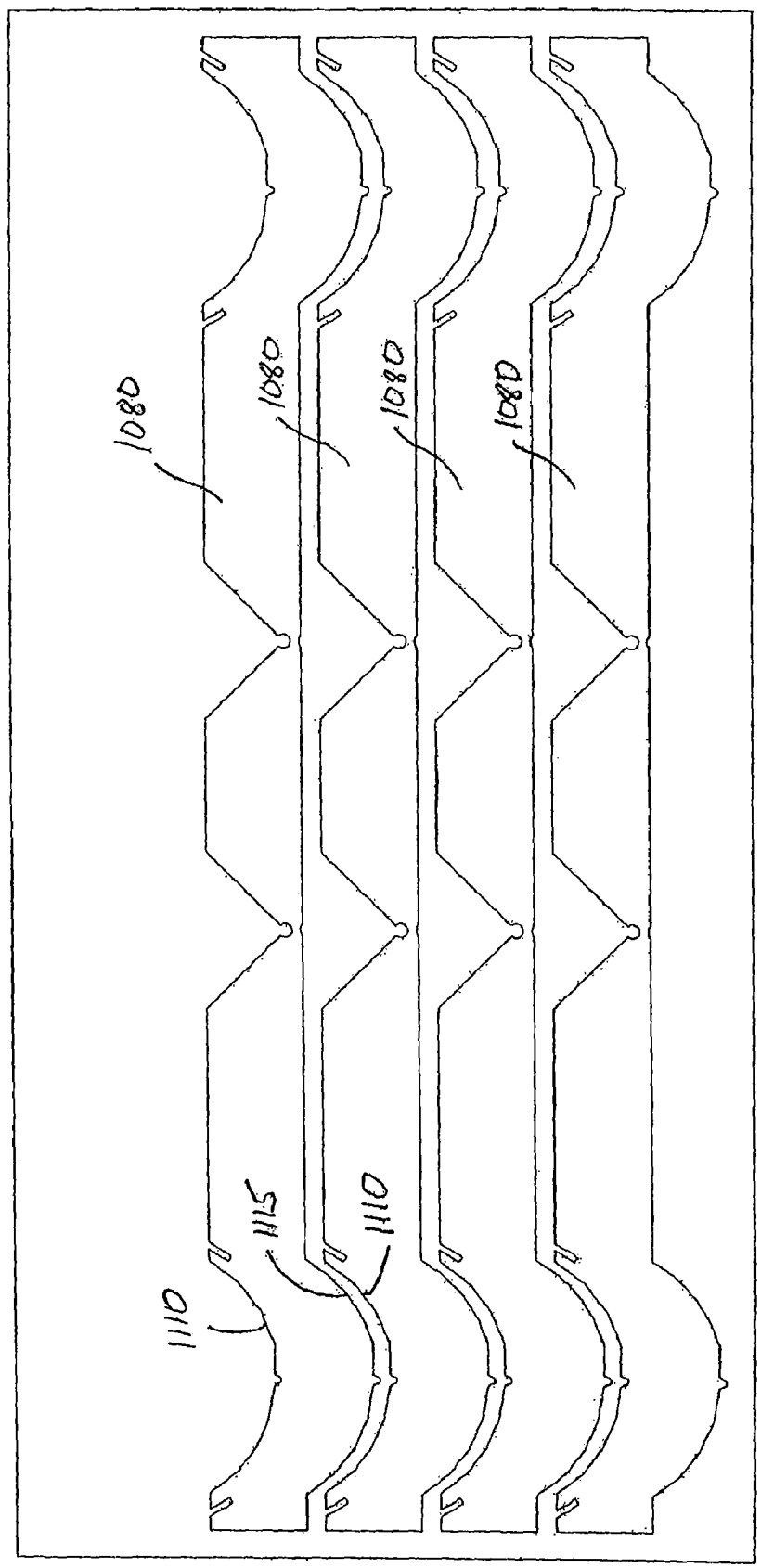
FIG. 11 is a front view of a plurality of laminations formed from a single sheet of material.

In preferred constructions, the stator core 895 is formed from a plurality of stacked laminations 1080. The laminations 1080, shown in FIG. 10, are generally formed from electric steel or other suitable materials. In some constructions, the laminations 1080 are punched from grain-oriented steel with a preferred magnetization direction 1081 extending along the length of the laminations 1080. When the lamination 1080 is reconfigured to its final operating position, the preferred magnetization direction is substantially U-shaped and matches the arrangement of the stator. Specifically, the metal has a grain structure oriented in a U-shaped direction when the lamination is in the U-shaped arrangement. This arrangement enhances the motor performance because in the finally assembled laminations (see for example FIG. 14) the magnetic field during motor operation is substantially aligned with the preferred magnetization direction of the steel. The lamination 1080 illustrated in FIG. 10, and arranged for forming (punching) as shown in FIG. 11, results in a very low scrap rate, thereby reducing the cost of a motor 810 produced with the laminations 1080.

With continued reference to FIG. 10, each lamination 1080 includes an elongated body portion 1085 and two curved portions 1090 disposed at either end of the body portion 1085. The body portion 1085 has a substantially constant width 1095 and defines two V-shaped reliefs 1100 that are positioned such that the apex of the "V" is positioned adjacent the intended corner of the stator core 895 when the lamination 1080 is reconfigured to a second U-shaped arrangement. In the illustrated construction, a circular aperture 1105 is positioned at the apex to provide additional relief that may be required during reconfiguration.

Each of the curved portions 1090 includes an inner arcuate surface 1110 and an outer arcuate surface 1115. In preferred constructions the inner arcuate surface 1110 and the outer arcuate surface 1115 are substantially circular and as such define a diameter. The diameter is thus the average diameter of the particular surface. The inner arcuate surface 1110 and the outer arcuate surface 1115 are arranged such that they define a curved portion width 1120. In preferred constructions the curved portion width 1120 is substantially constant and is substantially equal to the width 1095 of the body portion 1085. The inner arcuate surface 1110 and the outer arcuate surface 1115 have substantially the same circular profile with the same diameter. The surfaces can have a relatively small variation from a circular profile (e.g., elliptical) in order to allow for a tapered or stepped rotor to stator air-gap that may enhance the motor performance.

Each curved portion 1090 also defines an attachment aperture 1125 that extends through the lamination 1080 and two circumferential slots 1130. In the illustrated construction, the attachment apertures 1125 are circular apertures disposed near the outer arcuate surface 1115, with other shapes, sizes and locations also being possible. The two circumferential slots 1130 are formed near the inner arcuate surface 1110 adjacent the ends of each curved portion 1090.

The use of a lamination 1080 as illustrated in FIG. 10 allows the laminations 1080 to be manufactured from a single sheet of material as illustrated in FIG. 11. The arrangement of FIG. 10 allows for the production of several laminations 1080 that are very closely spaced, thus greatly reducing the amount of scrap. In addition, the arrangement allows the outer arcuate surface 1115 to closely match the inner arcuate surface 1110 to enhance the nesting arrangement.

Figure 12:
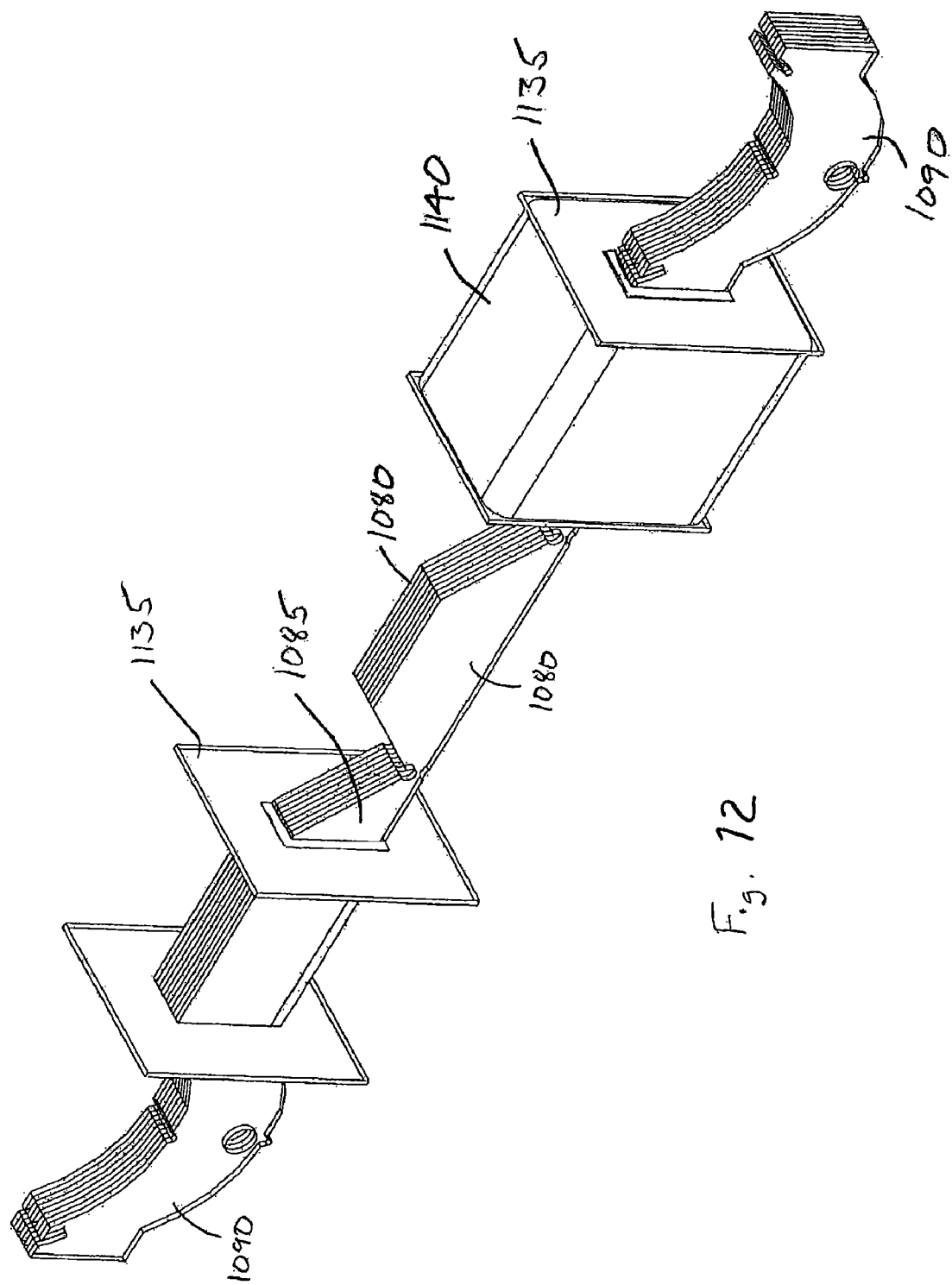
FIG. 12 is a perspective view of a partially assembled stator for use in the motor of FIG. 2.
Figure 13:
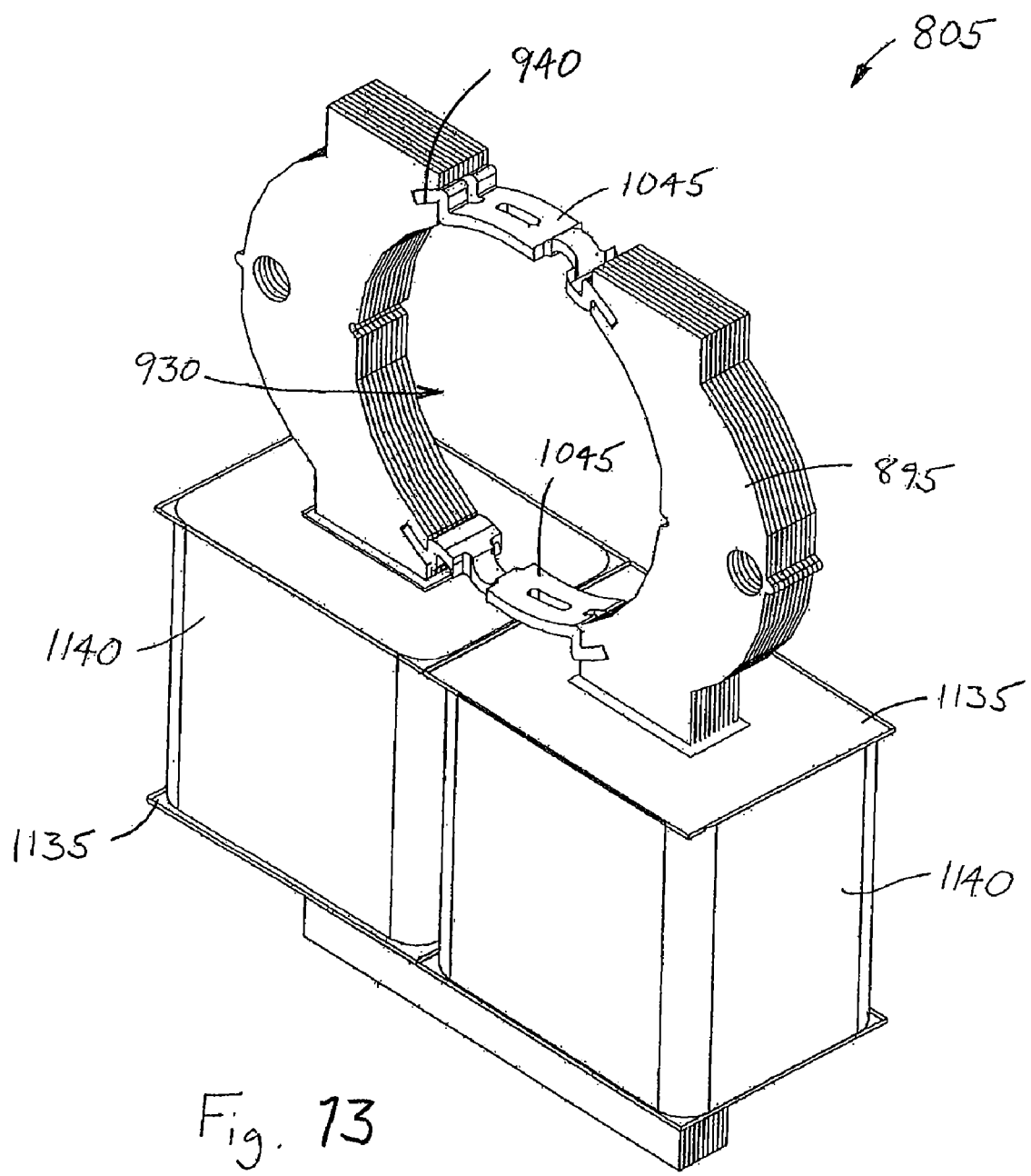
FIG. 13 is a perspective view of a stator suitable to be used in a motor of the type shown in FIG. 2.
Figure 74:
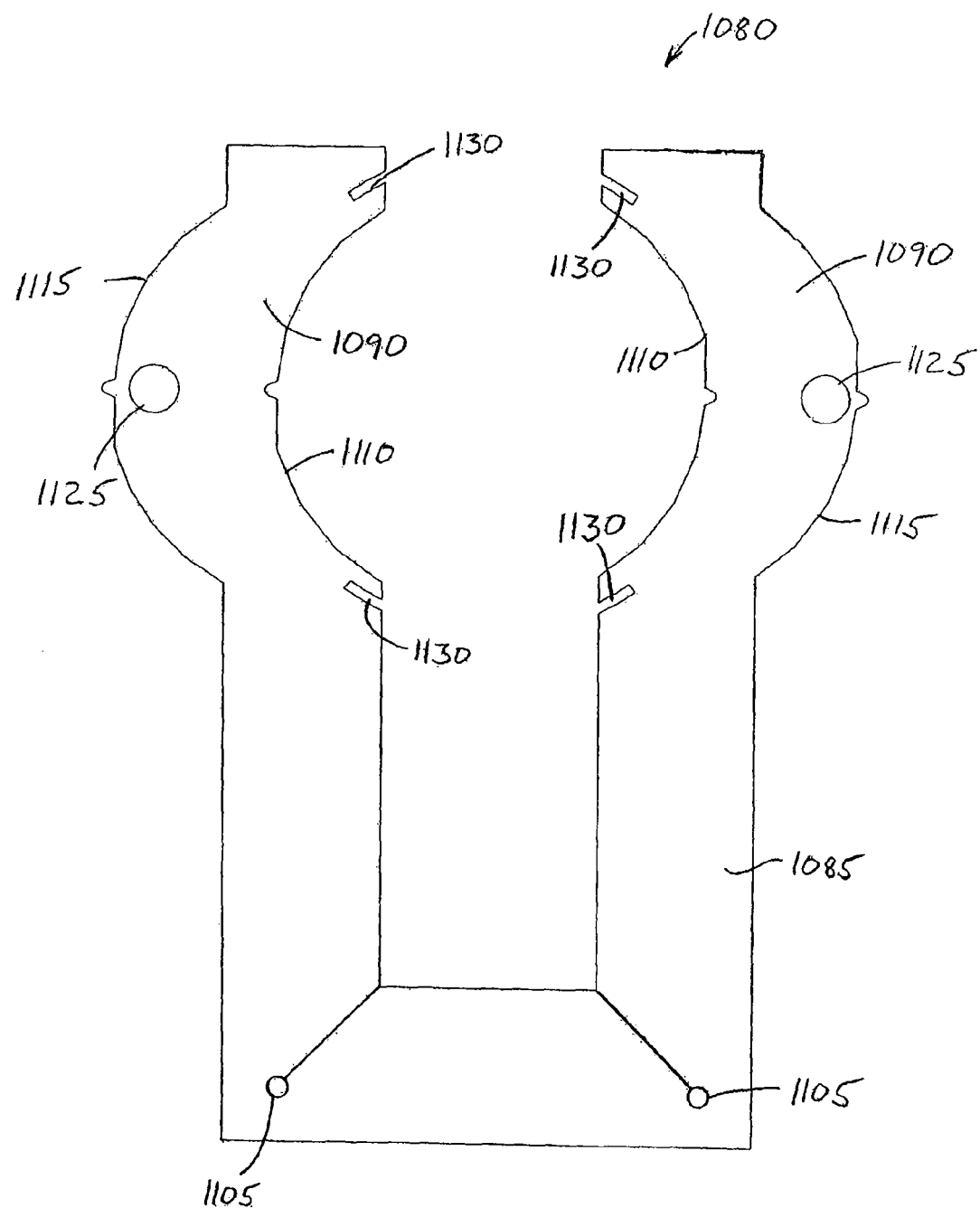

With reference to FIGS. 12-13, the assembly of the motor 810 of FIG. 2 will be described. A plurality of laminations 1080 are stamped or otherwise formed such that they resemble the laminations 1080 of FIG. 10. Several of the laminations 1080 are stacked on top of one another to define the stator core 895 having a desired axial depth. In the illustrated construction, eight laminations 1080 are stacked on top of one another while still arranged in a first elongated arrangement.

Bobbin supports 1135 made of an electrically insulating material are then positioned on the stator core 895 as illustrated. In one construction, the stacked stator core 895 is positioned in a mold and a moldable material is formed around the stator core 895 to define the bobbin supports 1135. For example, one construction injection molds plastic in the shape of the bobbin supports 1135. The bobbin supports 1135 in these constructions provide a location for a coil 1140 to be wound from electric conductor (magnet wire) and could also serve to hold the various laminations 1080 together. In other constructions, the bobbin supports include two pieces with a snap fit or other attachment means, or plastic end portions with insulation between the plastic ends covering the steel. In one construction, electrostatically-deposited electrical insulation is applied to the steel to at least partially define bobbin supports.

Once the bobbin supports 1135 are positioned as desired, the magnet wire is wound to complete each coil. FIG. 12 illustrates one bobbin support 1135 after the coil 1140 is wound and the second bobbin support 1135 before winding. With the bobbin supports 1135 and the laminations 1080 positioned as illustrated in FIG. 12, an inexpensive bobbin winder can be employed to wind the coils. FIG. 12 does not illustrate the magnet wire which is repeatedly wound, but rather illustrates the space occupied by the coil 1140 as a block of material on the bobbin 1135.

After the coils 1140 are wound, the laminations 1080 are bent, reconfigured or otherwise repositioned in a second U-shaped arrangement as illustrated in FIG. 13. The bridges 1045 are then coupled to the laminations 1080 to complete the stator assembly. While the preferred method of attaching the bridges is by inserting them in slots made into the stator core, it is understood that other known methods of coupling, such as pressing, gluing, screwing etc, may be employed. It should be noted that FIG. 13 illustrates the stator 805 as including the bridges 1045 of FIG. 9. However, other constructions may include the bridges 910, 955, 965 or 985 illustrated in FIGS. 5-8 rather than the bridges 1045 of FIG. 9. Alternatively, a combination of the bridges 910, 955, 965, 985, 1045 illustrated in FIGS. 5-9 may be employed. In still other constructions, no bridges, or other bridges not illustrated herein are employed.

With the stator assembly complete, the printed circuit board 820 and first bearing arrangement 825 are coupled to the stator 805 as illustrated in FIG. 2. The first bearing 845 and the first lubrication member 850 are positioned within the bearing support portion that is formed with the PCB 820. The first bearing retainer 855 is then positioned such that it engages the first bearing support portion and holds the first bearing 845 in the desired position. The PCB 820, including the first bearing 845 is then positioned adjacent the stator 805 as illustrated in FIG. 2. In some constructions, fasteners, stand-offs, pins, or other positioning members pass through the attachment apertures 1125 of the laminations 1080 and support the PCB 820 adjacent the stator 805 and in the desired position. The PCB 820 and stator 805 are then positioned within a mold and encapsulated in a material that defines the first encapsulation portion 1145. In one construction, molded or injection-molded plastic encapsulates the stator 805 and the PCB 820. Once encapsulated, the positioning members can be removed if desired, as the encapsulating material now performs all of the support and positioning functions.

As discussed, the second bearing arrangement 830 can be formed separate from the stator 805 and PCB 820 assembly if desired. Generally, in these constructions, the second encapsulation portion 875 is formed to include the pocket that receives the second bearing 880, the second lubrication member 885, and the second bearing retainer 890. The second bearing 880 and second lubrication member 885 are positioned within the pocket and the second bearing retainer 890 engages the walls that define the pocket to hold the second bearing 880 in the desired position.

The rotor 815, including the shaft 835 and the rotor core 840, is positioned within the encapsulated stator 805 such that one end of the shaft 835 engages the first bearing 845 and the rotor core 840 is positioned within the rotor space 930 defined by the laminations 1080 and the bridges 1045. The second bearing arrangement 830 is then positioned adjacent the encapsulated stator 805 and the rotor 815 such that the shaft 835 extends through the second bearing 880 and the second encapsulation portion 875. The second encapsulation portion 875 is then attached to the first encapsulation portion 1145 using any suitable means including adhesives, welding, fasteners, and the like. In some constructions, the positioning members extend beyond the first encapsulation portion 1145 and engage the second encapsulation portion 875 to properly locate the second encapsulation portion 875 and the second bearing 880. In the construction illustrated in FIG. 2, standoffs 856 are formed as part of the first encapsulation portion 1145. The standoffs 856 extend from the first encapsulation portion and fit within apertures in the second encapsulation portion 875. The standoffs 856 are then heat bonded, attached with an adhesive, or attached using other suitable means, to the second encapsulation portion 875.

In another construction, the stator 805, PCB 820, and second bearing 880 are encapsulated simultaneously in one step. In this construction, the PCB 820, including the first bearing 845 within the bearing support portion is supported in a mold adjacent the stator 805, which is also supported in the mold. The rotor 815 and second encapsulation portion 875 are also supported in the mold such that encapsulating material can be molded around all of the components in a single step to complete the motor 810. Variations in the order of operations and the techniques used to injection mold the entire assembly 810 are also possible. In other constructions, no plastic injection molding is employed and the motor is formed using conventional end-caps (brackets) as known to those skilled in the art. In still other constructions, injected molded parts, such as a PCB completely encapsulated in plastic, coils partially encapsulated in plastic and a plastic front cover, are combined with conventional parts, such as a zinc end-cap.

Figure 15:
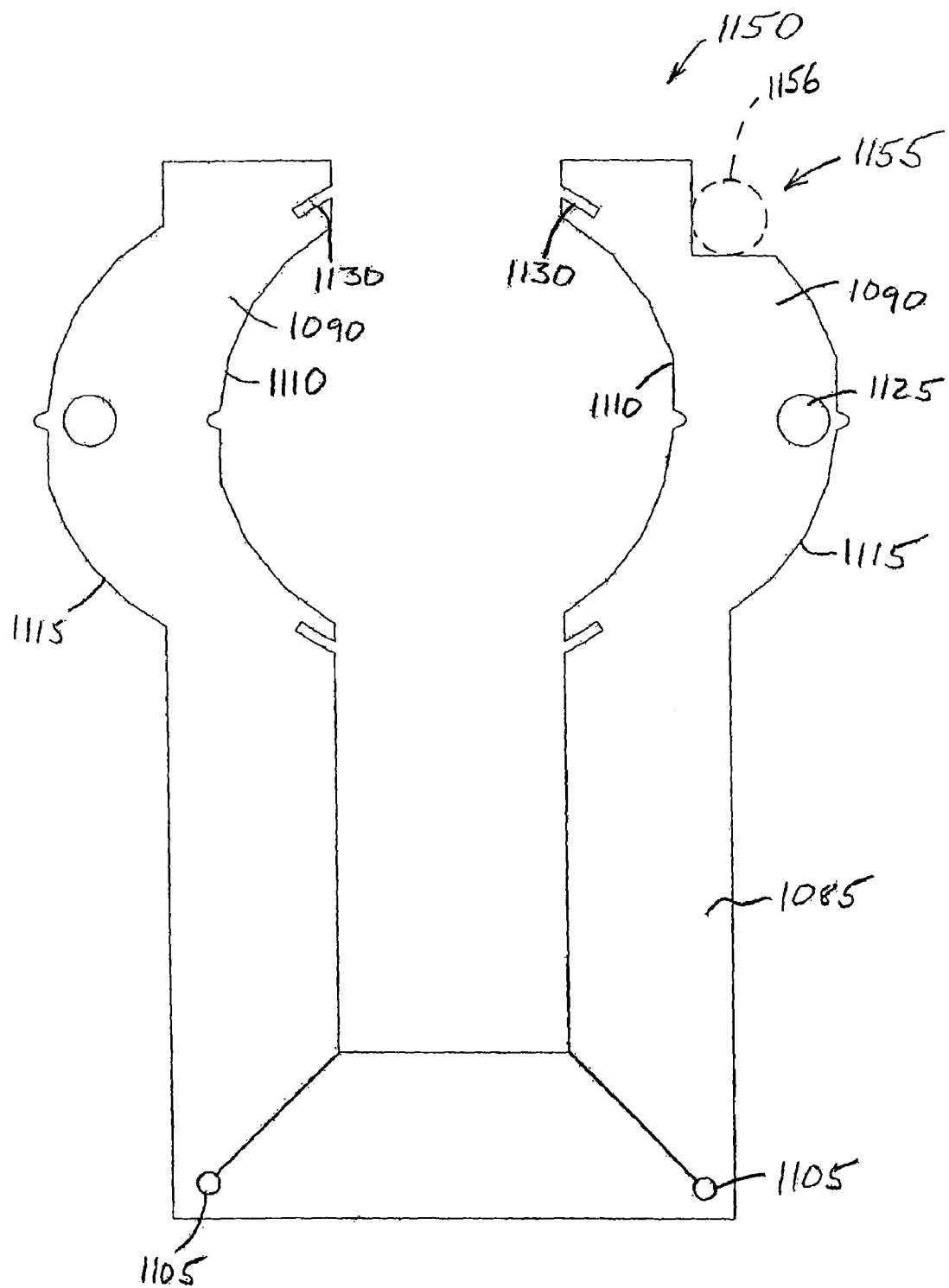
FIG. 15 is a front view of the lamination of FIG. 14 with a corner portion removed.

FIGS. 14 and 15 illustrate another aspect of the invention that may be incorporated into some constructions. FIG. 14 shows one of the laminations 1080 of FIG. 10 after it is bent into its operating position. As can be seen, the V-shaped openings 1100 close to provide the desired shape of the stator core 895. The corners formed by the now closed V-shaped openings 1100 include a break or discontinuity, oriented at approximately 45 degrees, that may reduce the electromagnetic performance of the motor 810 slightly. In a motor with a rotor made substantially of permanent magnet material (e.g., ceramic ferrite, rare-earth NdFeB, etc.), the mmf drop caused by the introduction in the magnetic circuit of the aforementioned corner discontinuities is minimal. However, the arrangement described does allow the lamination to have a substantially constant width along the magnetic circuit, thus enhancing the electromagnetic performance of the motor 810.

FIG. 15 illustrates another lamination 1150 that is similar to the lamination 1080 of FIG. 14. However, the lamination 1150 of FIG. 15 includes an open (cut-out) corner 1155 in which lamination material has been omitted. Modeling and testing has shown that very little magnetic flux passes through this particular corner 1155 during motor operation. The results of the electromagnetic finite element analysis are illustrated in FIGS. 21*a*-21*c* of U.S. Pat. No. 6,975,049 which is fully incorporated herein by reference. As such, the omission of this material has little effect on motor performance. However, the space created by the omitted material does provide space for electrical or other components such as a capacitor 1156, thus further reducing the overall size of the completed motor 810.

Figure 16:
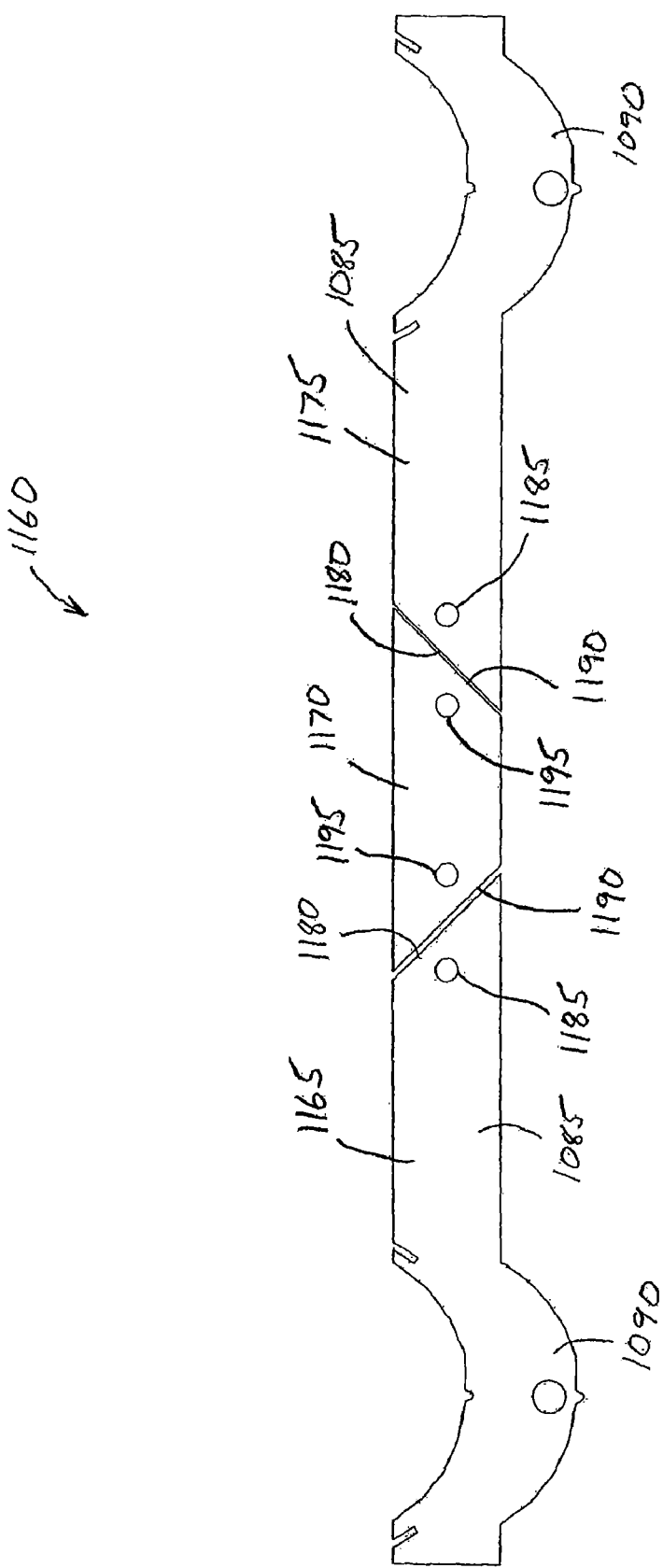
FIG. 16 is a front view of another lamination suitable for use in forming the stator of FIG. 2.
Figure 77:
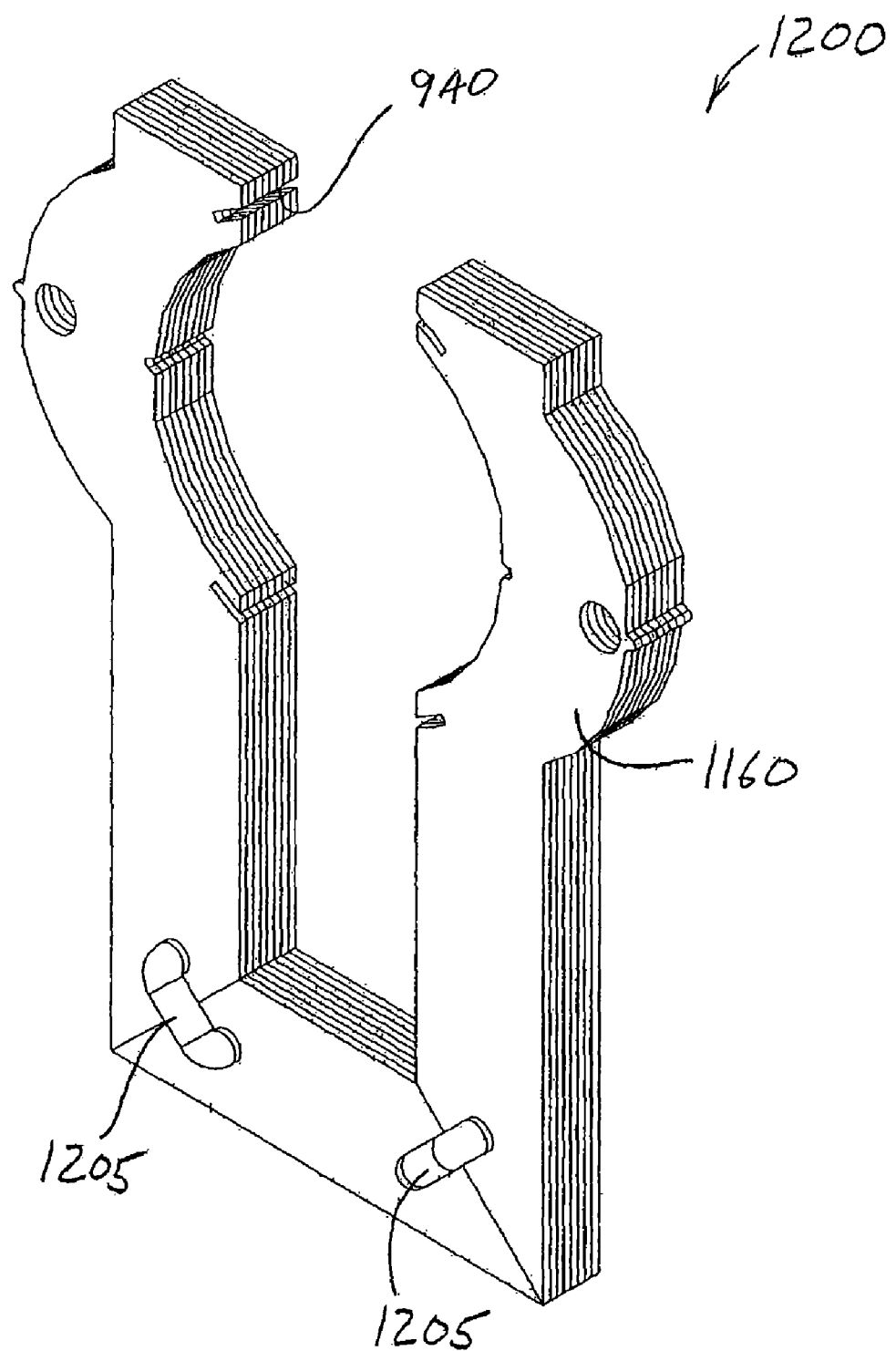
Figure 78:
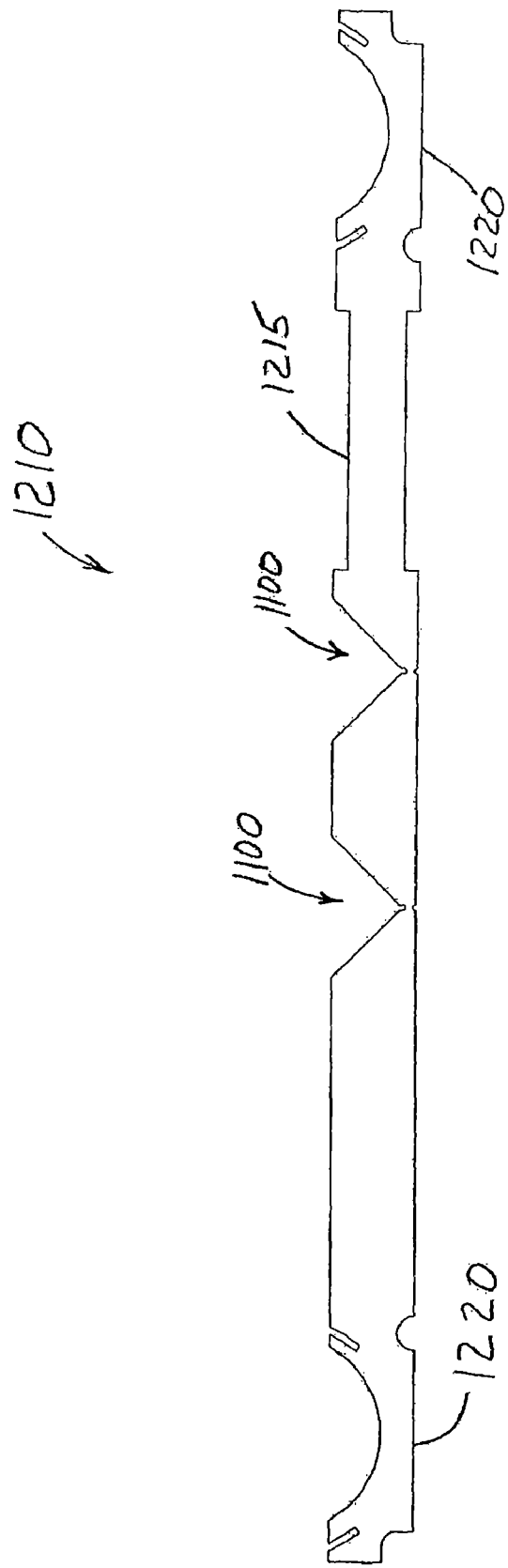

FIGS. 10-15 describe one basic arrangement of laminations 1080. However, one of ordinary skill in the art will realize that different variations in laminations are possible and FIGS. 16 and 17 are exemplary of one such variation. The lamination 1160 of FIG. 16 includes a first end piece 1165, a middle piece 1170, and a second end piece 1175 that can be arranged adjacent one another to allow for their production with a very low scrap rate. In fact, the laminations 1160 can be arranged such that almost no scrap is produced (see also FIG. 11).

The first and second end portions 1165, 1175 may, in some constructions be substantial mirror images of one another and include a curved portion 1090 that at least partially defines the rotor space 930. A body portion 1085 extends from the curved portion 1090 and terminates at an angled surface 1180. In the illustrated construction, the angle is approximately 45 degrees with respect to the body portion 1085. An attachment aperture 1185 is formed in each of the body portions 1085 near the angled surface 1180.

The middle piece 1170 is substantially trapezoidal with two angled surfaces 1190 that are angled to match the angles of the first and second end portion angled surfaces 1180. Thus, in the illustrated construction, the angles are approximately 45 degrees with respect to the body portions 1085. Two middle attachment apertures 1195 are formed in the middle piece 1170 with one adjacent each angled surface 1190.

Figure 21:
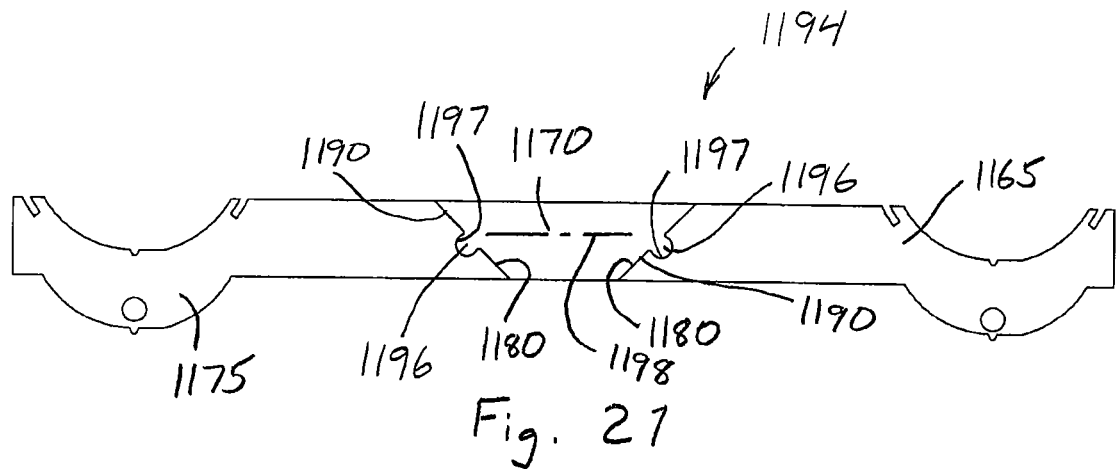
FIG. 21 is a front view of another lamination in a first elongated arrangement suitable for use in forming the stator of FIG. 2.
Figure 22:
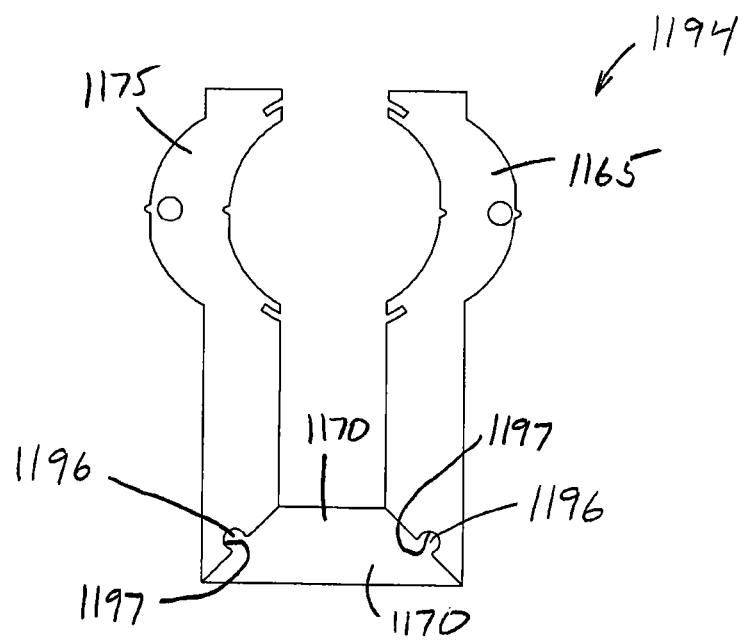
FIG. 22 is a front view of the lamination of FIG. 21 in a second U-shaped arrangement suitable for use in forming the stator of FIG. 2.

In some constructions, the end pieces 1165, 1175 and the middle piece 1170 include interlocking members, such as tabs and slots, balls and sockets, and the like, that further enhance the connection between the components to improve both the mechanical strength and the electrical performance of the stator. For example, FIGS. 21-22 illustrate a lamination 1194 in which the middle or intermediate piece 1170 includes balls 1196 that extend outward from the angled surface 1190. Each of the end portions 1165, 1175 includes a socket 1197 that extends inward from the angled surface 1180 and that is sized to receive the balls 1196. In FIG. 21, a socket 1197 and its mating ball 1196 have a common centerline that is perpendicular to the corresponding angled surface 1180. Because the angled surfaces 1180, 1190 are arranged at about 45 degrees with respect to a longitudinal axis 1198 of the lamination 1194 and are perpendicular to one another, the intermediate portion 1170 is simply rotated 180 degrees about the longitudinal axis 1198 and the end portions 1165, 1175 are connected to the intermediate portion 1170 such that the balls 1196 engage the sockets 1197 and the adjacent angled surfaces 1180, 1190 are substantially parallel to one another to change the arrangement from the first elongated arrangement of FIG. 21 to the second U-shaped arrangement illustrated in FIG. 22.

A stator core 1200 assembled using the laminations 1160 of FIG. 16 is illustrated in FIG. 17. To assemble the stator core 1200, the middle piece 1170 of each lamination 1160 is inverted and the first and second end portions 1165, 1175 are moved such that their respective angled surfaces 1180 align with the angled surfaces 1190 of the middle piece 1170. Several laminations 1160 are arranged as described and stacked on top of one another. Locking members 1205 are then positioned to lock the end portions 1165, 1175 to the middle pieces 1170. In constructions that employ the lamination of FIGS. 21 and 22, the function of the locking member 1205 is performed by the engagement of the balls 1196 with the adjacent sockets 1197.

In the illustrated construction of FIG. 17, a first U-shaped locking member 1205 is inserted into the attachment apertures 1185 of each of the first end portions 1165 and the attachment apertures 1195 of the middle piece 1170 adjacent the first end portions 1165, and a second U-shaped locking member 1205 is inserted into the attachment apertures 1185 of each of the second end portions 1175 and the attachment apertures 1195 of the middle piece 1170 adjacent the second end portions 1175. In other constructions, a molding operation is used to mold the U-shaped locking members 1205 in the desired position and complete the assembly of the stator core 1200 of FIG. 17. Other means could be used to assemble and hold the stator core 1200 if desired. Coils can be wound separately and slid on the lamination portions 1165 and 1175 prior to assembling the three-part U-frame core 1200.

FIG. 18 illustrates another more conventional lamination 1210 that includes a pocket 1215 sized and positioned to receive a bobbin 1135 or a wound conductor 1140 but that omits the outer curved surface and replaces it with a more conventional straight surface 1220. Only one pocket 1215 is illustrated on the lamination 1210. However, a second pocket 1215 could be employed if desired. In preferred constructions, the pocket 1215 receives the bobbin 1135 to fixedly locate and support the bobbin 1135. However, other constructions may apply the conductor 1140 directly to the pocket 1215 and omit the bobbin 1135. In addition, the pocket 1215 could be applied to differently arranged laminations, such as the lamination 1160 illustrated in FIG. 16, the lamination 1194 illustrated in FIG. 21, and/or the lamination 1080 illustrated in FIG. 10. Combinations of elements shown in FIGS. 10, 16, 18, 19 and 21 are also possible. For example, lamination 1194 of FIG. 21 can include pockets on legs 1165 and 1175 similarly to the pockets 1215 shown in FIG. 18.

FIGS. 19 and 20 illustrate another lamination 1225 suitable for use with the invention. The lamination 1225 is similar to the lamination 1080 of FIG. 10 with the exception of the area adjacent the V-shaped spaces 1100. Rather than employ a small circular aperture, the lamination 1225 of FIG. 19 includes a larger circular relief 1230 and a bump 1235 on the opposite side of the lamination 1225 from the V-shaped opening 1100. The bump 1235 includes a partially-circular portion that shares a substantially common center with the circular relief 1230 as illustrated in FIG. 20. Thus, the bump 1235 serves to provide a material ligament 1240 that is large enough to facilitate the bending of the lamination 1225 without failing, and ensures good perpendicularity tolerances of the bent structure. In the construction illustrated in FIG. 20, the V-shaped portion defines an imaginary apex 1245 that rests on an extension of the outer surface 1250 of the lamination 1225. This geometry allows for the consistent bending of the lamination 1225 to the desired final shape. Other constructions, may vary the size, width, or shape of the bump 1235 and the ligament 1240 as desired. In addition, other constructions may employ a shape other than a circle to define the relief 1230.

While the constructions of FIGS. 2-22 have been described as including stator cores formed from laminations, one of ordinary skill in the art will realize that other constructions, including powdered metal components, could be employed if desired. For example, a stator core having a substantially constant magnetic path width could be formed, if desired, from a single powdered metal component, such as for example a soft magnetic composite. As such, the invention should not be limited to stator cores constructed from laminations.

Figure 23:
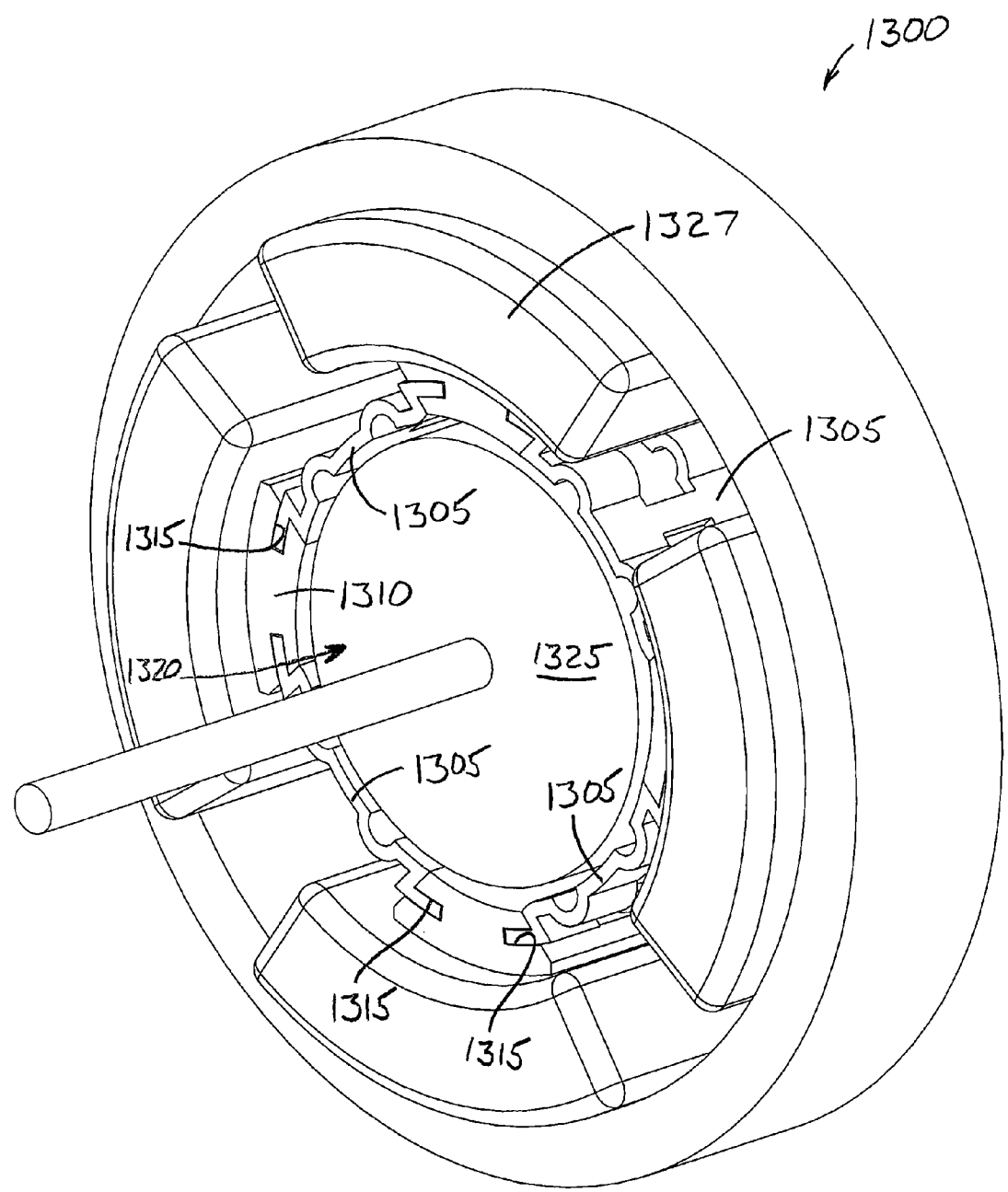
FIG. 23 is a perspective view of a rotor and a stator suitable for use in a motor similar to that of FIG. 1 and including bridges.
Figure 24:
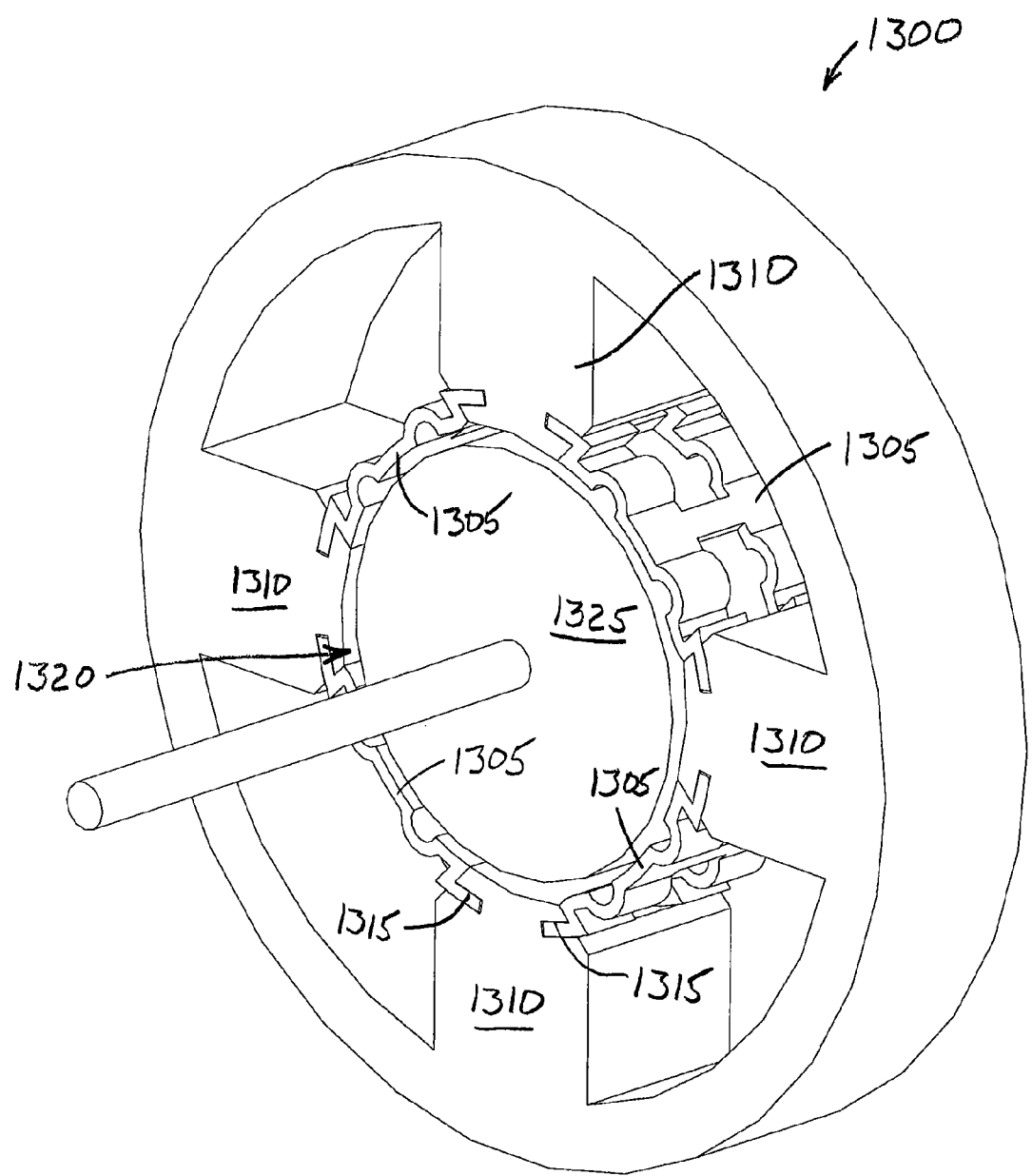
FIG. 24 is a perspective view of the rotor and the stator of FIG. 23 with the coils removed.

FIGS. 23-26 illustrate aspects of a stator 1300 suitable for use in a motor like the one illustrated in FIG. 1 and incorporating a number of bridges 1305 similar to those described with regard to the constructions of FIGS. 2-22. The stator is substantially circular and includes a number of teeth 1310 that extend radially inward. In the illustrated construction, the stator 1300 includes four teeth 1310 with other stators employing more or fewer teeth 1310 as required. The teeth 1310 are substantially uniform in width, as best illustrated in FIG. 24 and as such define wide slot openings. Each tooth 1310 defines two slots 1315 that extend in an axial direction and that are sized to receive one of the bridges 1305. The teeth 1310 extend inward to define a central aperture 1320 that receives a rotor 1325 much like conventional motors of this type.

The large slot openings allow a coil 1327 to be prewound and then slid onto the particular tooth 1310 if desired. Alternatively, the wide slot opening between the teeth 1310 facilitates the easy winding of the coil 1327 onto the tooth if desired.

Unlike conventional stators, the stator 1300 of FIGS. 23 and 24 includes bridges 1305 that extend across the slot openings to connect adjacent teeth 1310. Thus, the teeth 1310 and the bridges 1305 cooperate to completely surround the circumference of the rotor 1325, and particularly the rotor core.

Figure 25:
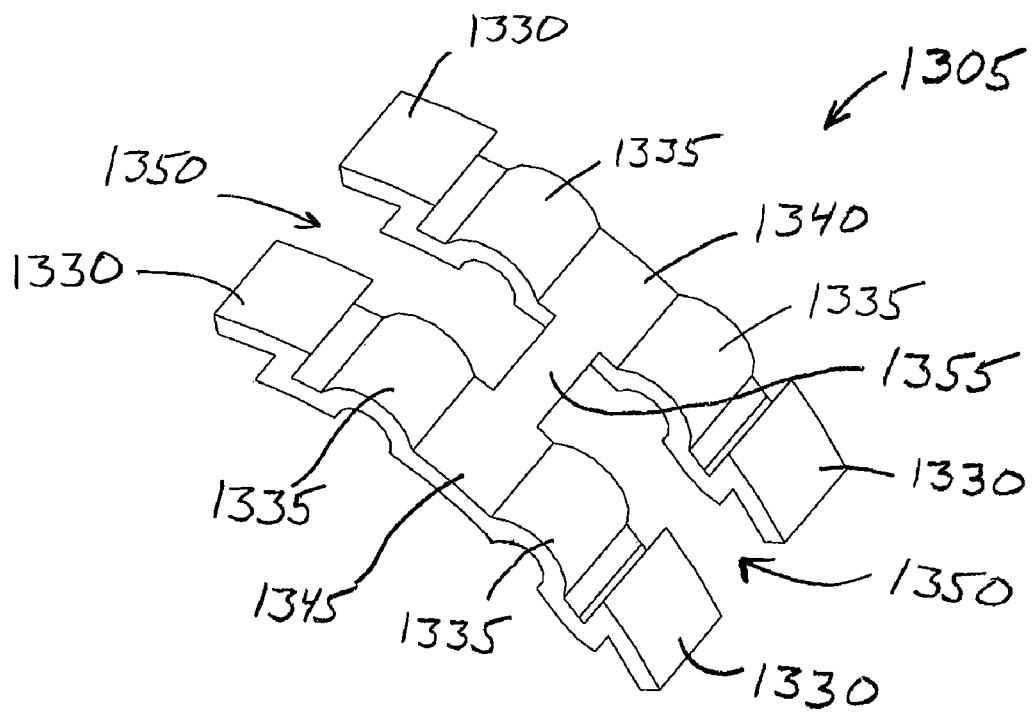
FIG. 25 is a perspective view of one of the bridges of FIG. 23.

While bridges configured as illustrated in FIGS. 5-9 could be employed in the stator 1300 of FIGS. 23 and 24, the stator 1300 of FIGS. 23 and 24 includes another bridge 1305 illustrated in FIG. 25. The bridge 1305 is similar to the bridge 965 of FIG. 7 and includes four tabs 1330 with two adjacent tabs 1330 arranged to engage one of the slots 1315 of the stator teeth 1310. The bridge 1305 also includes four corrugations 1335 that extend in a substantially axial direction with respect to the stator 1300. The bridge 1305 is divided into a first half 1340 and a second half 1345 by a pair of slots 1350 that extend in a circumferential direction and terminate at a ligament portion 1355 that maintains the connection between the first half 1340 and the second half 1345. In some constructions, additional slots 1350 are employed to divide the bridge 1305 into more than two parts if desired.

Figure 26:
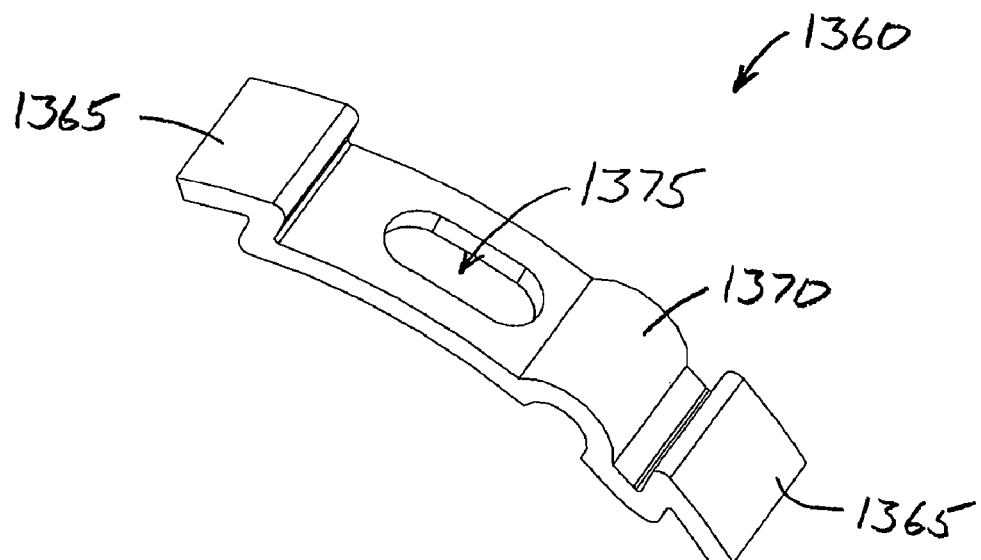
FIG. 26 is a perspective view of another bridge suitable for use in the stator of FIG. 23.

FIG. 26 illustrates yet another bridge 1360 that could be employed in the stator 805 of FIG. 2 or the stator 1300 of FIG. 23. The bridge 1360 includes two tabs 1365 that engage the tooth slots 1315, a single corrugation 1370 near one end of the bridge 1360, and a slot 1375 near the opposite end. The bridge 1360 includes substantially continuous tabs 1365 that, when inserted into the stator teeth slots 1315, ensure the continuity of the magnetic connection between the ferromagnetic core and the bridge 1360. The slot 1375 and the corrugation 1370 increase the equivalent magnetic length of the air-gap between the stator 1300 and the rotor 1325 and introduce an asymmetry that may be beneficial for certain type of motors, such as single phase motors. The eddy current path in the bridge 1360 is reduced due to the slot 1350.

The bridges can be manufactured from ferromagnetic material, such as cold rolled motor lamination steel that is non-grain oriented or from transformer laminated steel, which is grain oriented. If a grain oriented steel is employed, the slot leakage flux can be reduced by aligning the hard (non-preferential) magnetization axis of the steel with the circumferential direction surrounding the motor air-gap and the rotor.

It should be understood that each of the features described with respect to one or more of the bridge constructions illustrated herein could be applied to any other of the bridge constructions illustrated herein. As such, the lack of description with regard to any feature of a bridge should not be interpreted as an indication that the feature is not applicable to the particular bridge construction being described.

Thus, the invention provides, among other things, a new and useful stator for an electric motor. The constructions of the stator and the methods of manufacturing the stator described herein and illustrated in the figures are presented by way of example only and are not intended as a limitation upon the concepts and principles of the invention.

What is claimed is:

1. An electric machine comprising:
    a rotor;
    a first tooth portion;
    a second tooth portion spaced apart from the first tooth portion and cooperating with the first tooth portion to at least partially define a rotor opening, at least a portion of the rotor disposed within the rotor opening;
    a bridge having a first end connected to the first tooth portion and a second end connected to the second tooth portion such that the bridge defines a portion of the rotor opening; and
    an aperture defined by the bridge and disposed between the first end and the second end,
    wherein the bridge includes a corrugation formed as part of the bridge and disposed between the first end and the second end.

2. The electric machine of claim 1, further comprising a second corrugation formed as part of the bridge and disposed between the first end and the second end.

* * * * *